United States Patent
Maliszewski

(10) Patent No.: US 10,520,317 B2
(45) Date of Patent: Dec. 31, 2019

(54) IN-SITU WHEEL POSITION MEASUREMENT USING INERTIAL MEASUREMENT UNITS (IMUS)

(71) Applicant: Maliszewski Family 2001 Trust, San Diego, CA (US)

(72) Inventor: Gerald Maliszewski, San Diego, CA (US)

(73) Assignee: Maliszewski Family 2001 Trust, San Diego, CA (US)

( * ) Notice: Subject to any disclaimer, the term of this patent is extended or adjusted under 35 U.S.C. 154(b) by 166 days.

(21) Appl. No.: 15/609,116

(22) Filed: May 31, 2017

(65) Prior Publication Data

US 2017/0350684 A1 Dec. 7, 2017

Related U.S. Application Data

(60) Provisional application No. 62/344,501, filed on Jun. 2, 2016, provisional application No. 62/395,028, filed on Sep. 15, 2016.

(51) Int. Cl.
  *G01B 5/255* (2006.01)
  *G01C 21/16* (2006.01)
  *G01B 5/00* (2006.01)

(52) U.S. Cl.
  CPC .......... *G01C 21/16* (2013.01); *G01B 5/0025* (2013.01); *G01B 5/255* (2013.01)

(58) Field of Classification Search
  CPC ..... G01B 21/26; G01B 2210/20; G01C 21/16
  USPC .......... 702/92, 104, 141, 151, 154; 180/204; 701/31.4, 41, 45, 70, 472, 34.4; 33/301
  See application file for complete search history.

(56) References Cited

U.S. PATENT DOCUMENTS

| 4,879,670 | A | 11/1989 | Colarelli |
| 5,360,184 | A | 11/1994 | Johnson |
| 5,764,014 | A | 6/1998 | Jakeway et al. |
| 6,915,187 | B2* | 7/2005 | Fonzes ............... B60C 23/0416 180/204 |
| 7,089,150 | B2 | 8/2006 | Phillips |
| 7,239,949 | B2 | 7/2007 | Lu et al. |
| 7,373,227 | B2 | 5/2008 | Lu et al. |
| 7,493,805 | B2 | 2/2009 | Ben-David |
| 7,908,760 | B2 | 3/2011 | Milburn |

(Continued)

FOREIGN PATENT DOCUMENTS

| CN | 2016/37419 | 11/2010 |
| CN | 102470711 | 5/2012 |

(Continued)

*Primary Examiner* — John H Le
(74) *Attorney, Agent, or Firm* — Law Office of Gerald Maliszewski; Gerald Maliszewski

(57) ABSTRACT

Disclosed herein are systems and methods for the in-situ determination of vehicle wheel position using an inertial measurement unit (IMU). In one aspect as the wheel is rotating, gyroscope measurements are used to find a slip angle defined between the direction of wheel travel and the direction of vehicle travel, to determine a toe alignment condition for the wheel. System and methods are also presented for using an accelerometer to measure slip angle and camber angle. Using an accelerometer or gyroscope, instantaneous wheel angle measurements can also be made to predict vehicle movement, and aid in autonomous steering and in-situ wheel alignment adjustments.

20 Claims, 17 Drawing Sheets

(56) References Cited

U.S. PATENT DOCUMENTS

| | | |
|---|---|---|
| 8,001,860 B1 | 8/2011 | Preston et al. |
| 8,024,119 B2 | 9/2011 | Zeng et al. |
| 8,706,347 B2 | 4/2014 | Bae et al. |
| 8,843,290 B2 | 9/2014 | Kulik et al. |
| 8,957,355 B1 | 2/2015 | Truncale et al. |
| 8,996,310 B1 | 3/2015 | Zhang et al. |
| 9,157,724 B2 | 10/2015 | Nagornov |
| 9,482,685 B1 | 11/2016 | Bibeault |
| 2008/0291042 A1 | 11/2008 | Soares |
| 2013/0259244 A1 | 10/2013 | Christennen |
| 2013/0278771 A1 | 10/2013 | Magoun et al. |
| 2013/0342341 A1 | 12/2013 | Simmerman et al. |
| 2014/0372063 A1 | 12/2014 | Niu et al. |
| 2015/0221144 A1* | 8/2015 | Kourtev ............. G01B 21/26 701/34.4 |
| 2016/0018209 A1 | 1/2016 | Nagornov |
| 2016/0054355 A1 | 2/2016 | Schlager et al. |

FOREIGN PATENT DOCUMENTS

| | | |
|---|---|---|
| CN | 102717673 | 10/2012 |
| CN | 103884518 | 6/2014 |
| WO | WO2014/025661 | 2/2014 |
| WO | WO2016/118926 | 7/2016 |

\* cited by examiner

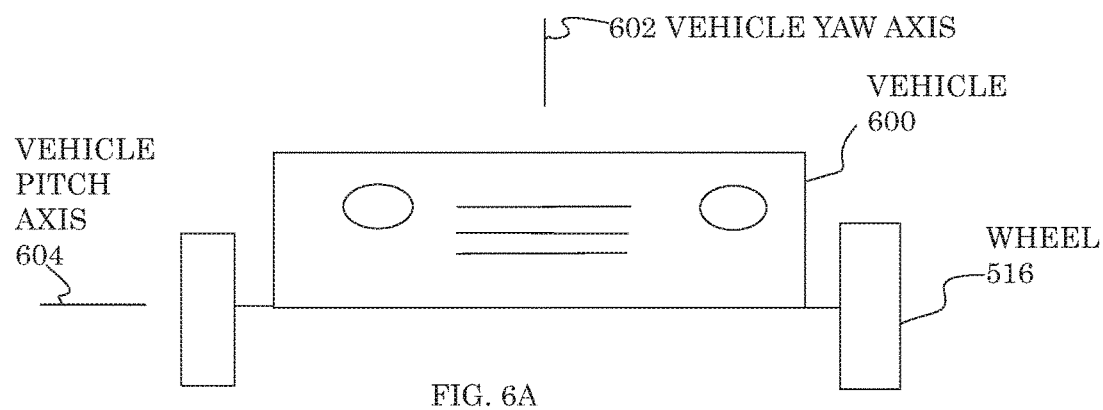
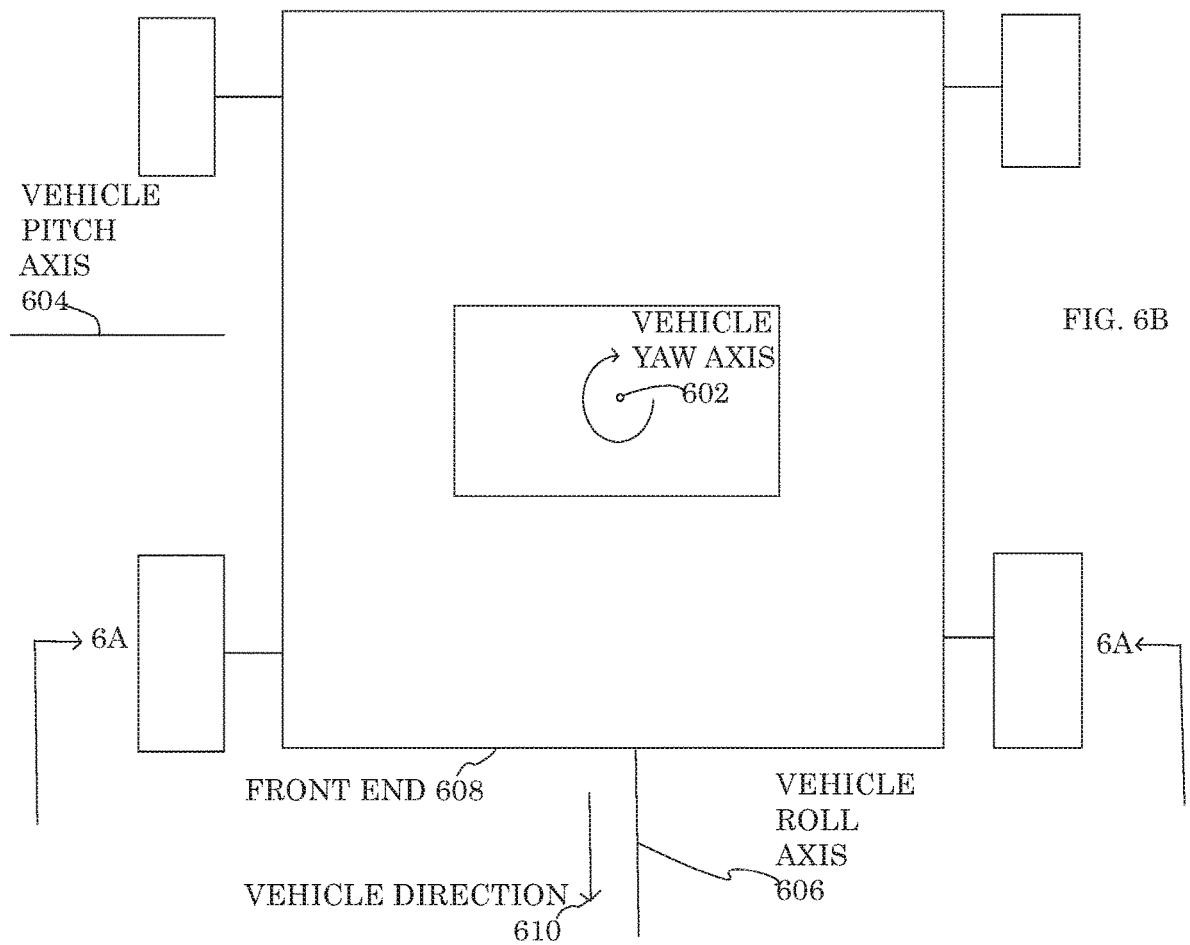

IN-SITU WHEEL POSITION MEASUREMENT USING INERTIAL MEASUREMENT UNITS (IMUS)

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to vehicle wheel position determination and, more particularly, to systems and methods for in-situ wheel alignment determination and vehicle movement prediction using an inertial measurement unit (IMU).

2. Description of the Related Art

Tires are an item excluded in the consumer price index (CPI) that have been known to be increase at a rate far above the CPI. While all the items in the annual inflation rate claimed by the CPI have been less than 1%, at some recent times, tires costs have gone up 1.2% every two days on average during the same period of time. As is well known, tire alignment is a key factor in minimizing tire wear, and thus, minimizing tire costs. Depending on driving habits, a set of tires may require several visits to a garage to maintain alignment over the life of the tires. Many consumers don't bother having an alignment performed when new tires are purchased, or the garage installing the tires may not even offer the service. Other consumers may only have an alignment preformed initially when the tire are purchased, but not thereafter. Still other consumers may purchase an alignment warranty (unlimited alignment services for a contracted duration of time). Even with a warranty, the consumer may be reluctant to use it, as it takes time, requires scheduling pickup and delivery, and an out-of-alignment condition cannot be determined by the user until at least some damage has occurred. There are three primary components of tire alignment: camber, toe, and caster angle.

FIGS. 1A, 1B, and 1C respectively depict the elements of caster angle, camber angle, and toe, the three primary components of tire alignment (prior art). Caster angle (FIG. 1A) is the angular displacement from the vertical axis of the suspension of a steered wheel in a car. That is, it is the angle between the pivot line (an imaginary line that runs through the center of the upper ball joint to the center of the lower ball joint) and vertical. The primary reason for adjusting the caster angle is to achieve a self-centering steering action. The caster angle is typically set positive (as shown) so that the pivot line intersects the ground slightly before the contact patch. An increase in the caster angle to improve cornering (e.g., in racing) is achieved at the cost of uneven wear.

Camber angle (FIG. 1B) is the angle between the vertical axis of the wheels used for steering and the vertical axis of the vehicle when viewed from the front or rear. If the top of the wheel is farther out than the bottom (i.e., further away from the vehicle center), it is called positive camber. If the bottom of the wheel is farther out than the top (as shown with a wheel mounted on the driver's left), it is called negative camber. The camber angle is rarely zero, although that angle is best for traction, as the inside edge of the tire tends to lift, thus, reducing the contact patch (the portion of the tire contacting the ground). Negative camber improves grip of the outside tire when cornering and prevents the tire from rolling on itself during cornering.

Toe (FIG. 1C), also known as tracking or slip angle, is the symmetric angle that each wheel makes with the longitudinal (roll) axis of the vehicle. Negative toe, or toe-out (as shown in the plan view of a wheel mounted on the driver's left), is the front of the wheel pointing away from the centerline of the vehicle. Positive toe, or toe-in is the front of the wheel pointing towards the centerline of the vehicle. Toe can be measured as an angular deflection or slip angle. In rear wheel drive cars, increased front toe provides greater straight line stability at the cost of tire wear and turning response. Toe is always adjustable in production automobiles, even though caster angle and camber angle are often not adjustable.

Inertial measurement was initially developed for airplane and satellite tracking, as their movement cannot be tied to a stationary reference point. Inertial navigation systems contain inertial measurement units (IMUs) which have angular and linear accelerometers to detect changes in position. Some IMUs include a gyroscopic element for maintaining an absolute angular reference. Ideally, the accelerometer and magnetometer respectively measure the field strength of the local gravitational and magnetic fields produced by a reference object, such as Earth, and in turn produce sensor field strength readings. The gyroscope measures the rotational speed of the sensor relative to itself, producing a sensor rotational speed reading. The sensor field strength and rotational speed readings may be used singularly or in combination to compute the orientation of the IMU and its associated objects relative to the reference object. This object orientation is typically applied in an object motion tracking application.

In the case of an airplane, angular accelerometers or gyroscopes can measure how the vehicle is rotating in space. Generally, there is at least one sensor for each of the three axes: pitch (nose up and down), yaw (nose left and right), and roll (clockwise or counter-clockwise from the cockpit). Linear accelerometers can measure non-gravitational accelerations of the vehicle. Since the airplane can move in three axes (up & down, left & right, forward & back), there may be a linear accelerometer for each axis. Single and multi-axis accelerometers detect the magnitude and direction of the proper acceleration (or g-force), as a vector quantity, which can be used to sense orientation.

A gyroscope detects changes in rotational attributes like pitch, roll, and yaw. When rotating, the orientations of the gyroscope axes are unaffected by tilting or rotation of the mounting, according to the conservation of angular momentum. The direction of the angular velocity vector is perpendicular to the plane of rotation, in a direction which is usually specified by the right-hand rule. In other words, an IMU can detect a change in its geographic position (North, for example) and a change in its velocity (speed and direction of movement). By integrating the gyroscope readings, typically output as degrees per second, a change in orientation (rotation about an axis) or angle can be found. A computer application can calculate a vehicle's current position by integrating over time the six degrees of freedom (x, y, z and $\theta_x$, $\theta_y$, $\theta_z$).

FIG. 2 is a schematic block diagram of a rate gyroscope (prior art). The input to the gyroscope is the rate of inertia wheel turn, or angular rate. The gimbal turns around the output axis in response to the rate of turn around the input axis. The precession of the gimbal, which can be measured, occurs when the inertia wheel is spinning, and is sprung to restore the gimbal to its original position. Otherwise, if the gimbal is rigidly mounted to a body, a change in gimbal (body) position results in a torque about the input axis, which can also be measured.

FIG. 3 is a schematic block diagram of an exemplary single-axis micro-machined electro-mechanical systems (MEMS) vibrating structure gyroscope (prior art). These types of gyroscopes are small in size, not prone to gimbal lock, and commercially available. While these devices typically operate through the measurement of Coriolis forces, they provide results equivalent to a rotary gyroscope. As would be well-known in the art, the mass is driven sinusoidally along a first axis using the inner set of strings, and a rotation in the housing produces Coriolis acceleration in the mass, pushing it along a second axis in cooperation with the outer set of springs. Other miniature gyroscopes, using tuning forks for example, are also capable of performing the same function.

FIG. 4 is a schematic block diagram depicting an exemplary single-axis accelerometer (prior art). The accelerometer behaves as a damped mass on a spring. Acceleration of the housing along the first axis displaces the mass, which compresses or expands the springs, whose tension can be read and expressed as a measurement aligned with the spring. More practical and smaller piezoelectric, piezoresistive, capacitive, and MEMS accelerometers are known in the art and are commercially available.

It would be advantageous if wheel alignment and instantaneous wheel position measurements could be made in-situ, without bringing a vehicle into a garage or wheel alignment facility.

SUMMARY OF THE INVENTION

Disclosed herein is a method for the in-situ determination of vehicle wheel alignment and instantaneous wheel position using an inertial measurement unit (IMU). One method provides an IMU with a gyroscope, mounted on the wheel of a vehicle. Assuming a conventional wheel rotating along a ground surface, the gyroscope is oriented so as to measure an angle with respect a roll axis of the wheel. The roll axis of the wheel is aligned with (parallel to) the direction of wheel travel. The direction of wheel travel is the transverse motion of the wheel, ignoring the rotational movement. The radial axes of the wheel can be imagined as being aligned with the spokes of the wheel. As the vehicle is moving, gyroscope measurements are taken, and the gyroscope measurements are used to find a wheel angle measured between the direction of vehicle travel (vehicle roll axis) and the direction of wheel travel (wheel roll axis). In response to finding an average wheel angle (the slip angle), a wheel alignment toe condition is determined. Otherwise, an instantaneous measurement of the wheel angle, which varies from the slip angle for example when the vehicle is turning, permits a vehicle movement prediction to be made. More explicitly, the gyroscope finds the yaw rotation about a yaw axis of the wheel. The wheel yaw axis is orthogonal to the wheel roll axis, so that a change in yaw rotation changes (or shows a change in) the direction of wheel travel. If the gyroscope is mounted on a non-rotating part of the wheel, the gyroscope yaw axis is aligned in a nominal vertical direction, orthogonal to the roll and lateral (pitch) axes of the wheel. Any differences between the nominal vertical direction and the true vertical direction may be due to the wheel camber or the non-rotating part of the wheel being in a different plane that the wheel radial axis, and can be addressed through calibration or the use of multiple orthogonally aligned gyroscopes. By integrating the angular rate, or rate of rotation provided by the gyroscope, the wheel angle is calculated.

If the gyroscope is mounted on a rotating portion of the wheel, the gyroscope yaw axis may be aligned with the radial axis of the wheel. Then, for every rotation of the wheel, the gyroscope finds a peak yaw rotation by measuring a maximum yaw rotation, for example, when yaw axis is orthogonal to the direction of wheel travel (e.g., measuring rotation in the counterclockwise direction). The direction of wheel travel should be understood to be translational motion, ignoring wheel rotation, differing from the direction of vehicle travel, on average, by the slip angle. Alternatively or in addition, the peak yaw rotation may be a minimum yaw rotation, defined herein as when the when yaw axis is orthogonal to the direction of wheel travel (e.g., measuring rotation in the clockwise direction). Note, the terms maximum and minimum are arbitrarily defined.

In another variation, the method provides an IMU with an accelerometer mounted on the wheel of a vehicle to measure acceleration on the wheel. The method also determines the acceleration on the vehicle. By finding the difference between the acceleration of the vehicle and the acceleration of the wheel, the wheel position can be found. In one aspect, the acceleration on the vehicle is the acceleration in the vehicle direction, and the average difference in acceleration can be used to find the slip angle. Otherwise, the instantaneous acceleration difference can be used to predict vehicle movement. If the accelerometer is mounted on a non-rotating part of the wheel, the accelerometer may be aligned (to maximally measure acceleration) along either a lateral (pitch) axis of the wheel or the roll axis of the wheel. The acceleration of the vehicle can be determined from a specialized speedometer or an accelerometer(s) mounted on the vehicle itself, to mention a few examples. The wheel acceleration measurement in the direction of wheel travel (wheel roll axis) should be slightly less than the vehicle acceleration if a slip angle exists. Knowing at least one of the two of the vectors representing acceleration on the wheel, and using geometric and trigonometric functions, the third side of the vector triangle and the wheel angle can be determined. Likewise, the relatively small measurement of acceleration along the wheel lateral axis can be used to find the wheel angle using trigonometric functions. In one variation, a first accelerometer is aligned along the lateral axis of the wheel and a second accelerometer is aligned along the roll axis of the wheel, whose measurements totally define the acceleration forces on the wheel (excluding gravity). In this case, the third side of the triangle, the acceleration of the vehicle, can be found by summing the first and second accelerometer measurements. As above, the wheel angle can be found using trigonometric functions.

If the accelerometer is mounted on a rotating part of the wheel and aligned along the lateral axis of the wheel, it provides an incomplete description of the acceleration of the wheel. However, when compared to the acceleration of the vehicle, the wheel angle can be found using trigonometric functions as described above.

In a different aspect, an accelerometer can be mounted on the wheel and aligned orthogonal to the lateral axis of the wheel. Accelerometer measurements compared to gravity (1G) in the true vertical direction can be used to determine the wheel camber angle. When mounted on a non-rotating part of the wheel, the accelerometer is aligned in the nominal vertical direction, orthogonal to the lateral and roll axes of the wheel. When mounted on a rotating part of the wheel, the accelerometer is aligned with the radial axis of the wheel and multiple measurements are made (when the wheel is stationary) after a corresponding number of vehicle movements, so as to find the maximum (or minimum) accelerometer measurement for comparison to 1 G. Knowing the acceleration vectors associated with gravity and the nominal vertical direction, the camber angle can be found using trigonometric relationships.

Additional details of the above-described methods and IMU wheel alignment detection systems are provided below.

BRIEF DESCRIPTION OF THE DRAWINGS

FIGS. 6A and 6B are, respectively, cross-sectional and plan views of a vehicle.

DETAILED DESCRIPTION

Figure 5:
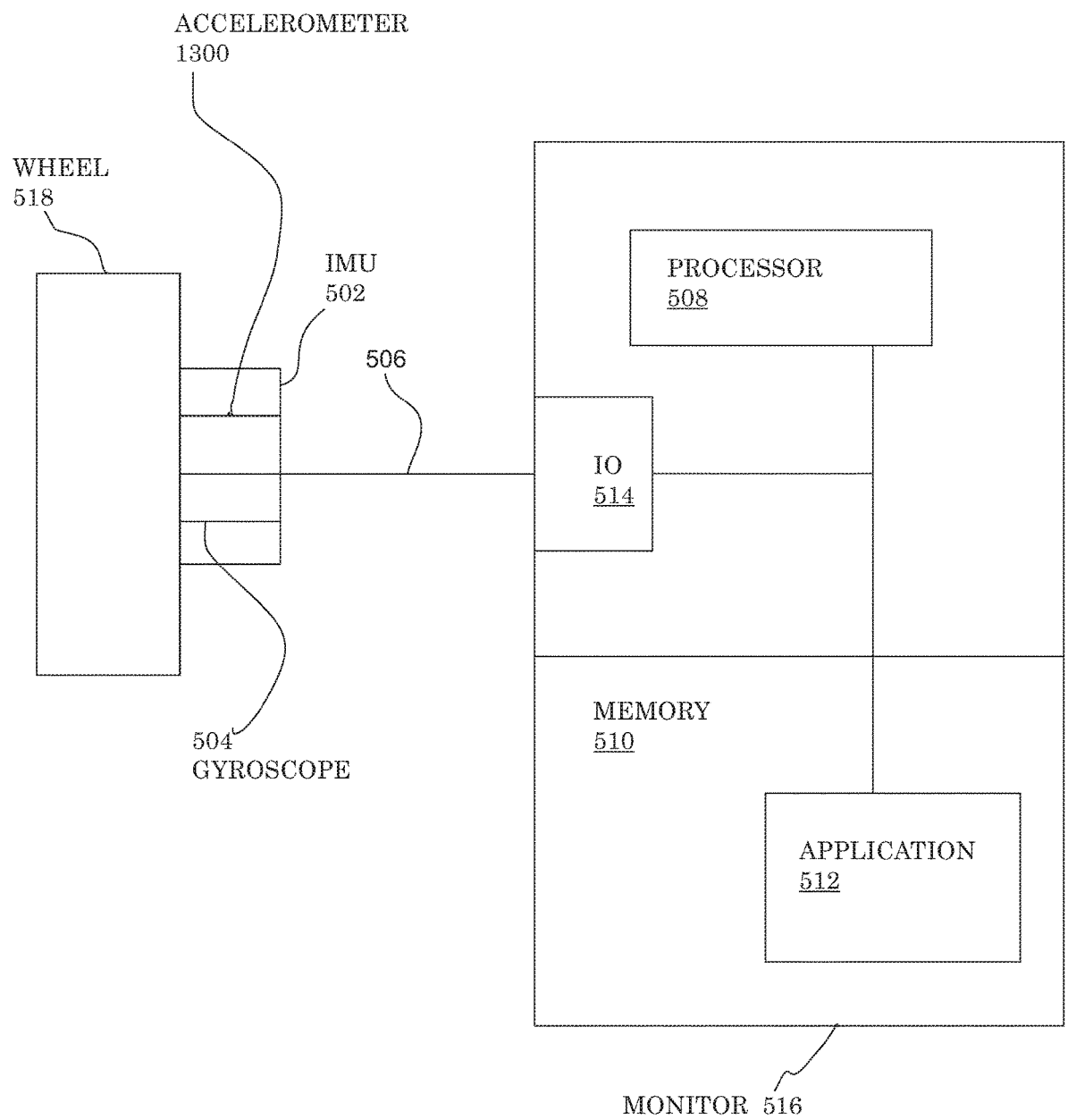
FIG. 5 is a schematic block diagram depicting a system for the in-situ determination of vehicle wheel position using an inertial measurement unit (IMU).

FIG. 5 is a schematic block diagram depicting a system for the in-situ determination of vehicle wheel position using an inertial measurement unit (IMU). The system comprises an IMU 502 with a wheel-mounted gyroscope 504 having an output on line 506 to supply gyroscope measurements. The system also comprises a processor 508, a non-transitory memory 510, and an application 512 enabled as a sequence of processor executable instructions stored in the memory. The application 512 has an interface on line 506 to accept gyroscope measurements via input/output (IO) 514. The IO 514 may be more than one interface. The interface may be a modem, cellular, WiFi, Bluetooth, an Ethernet card, or any other appropriate data communications interface such as USB. The physical communication links may be optical, wired, or wireless. The application 512 finds a wheel angle measured with respect to a roll axis of the wheel (see FIGS. 7A and 7B). In response to finding the average wheel angle, the application 512 determines the wheel alignment toe condition. Otherwise, the application 512 may find an instantaneous wheel angle for use in predicting subsequent wheels angles and vehicle position. The angle of the wheel with respect to the vehicle provides a useful indication of the direction of subsequent vehicle movement. The wheel angle is particularly subject to change when the vehicle is turning. When combined with other sensors, such as the steering wheel position, the heading set by an automated steering controller, or a global positioning satellite (GPS) receiver mounted on the vehicle, vehicle position can be predicted with greater accuracy. Averaged over a long period of time, or during a period of time when the vehicle is moving in a straight line, the wheel angle is a measurement of wheel slip angle. Slip angle may also be measured using a gyroscope (or accelerometer) when the steering wheel or steering controller is set to the middle (straight ahead) position. In addition, a Kalman filter might be adapted for this purpose.

The gyroscope output may be supplied via a hardwired connection if the processor and memory are co-located in the same device. Alternatively, the processor and memory may be embedded in the console of the vehicle, in a smartphone as an application, or as an alignment function tester. In the latter cases, the IMU 502 may communicate via a wireless communication link, which may be proprietary, WiFi, or Bluetooth for example. In another aspect, the IMU 502, and optionally the monitor 516, is embedded in the valve stem of the tire or with a direct tire pressure monitoring system (TPMS). In this case, the TPMS and the wheel position system may share the same radio frequency (RF) communication link and communication protocols.

FIGS. 6A and 6B are, respectively, cross-sectional and plan views of a vehicle. The vehicle 600 has a yaw axis 602, pitch (lateral) axis 604, and roll axis 606. These are the same axes typically associated with an aircraft. The vehicle 600 has a front end 608, and in the interest of simplicity it is assumed that the vehicle direction of travel 610 is forward and aligned with the vehicle roll axis 606. However, a similar understanding of the system can be obtained from a vehicle moving in the reverse direction.

Figure 7A:
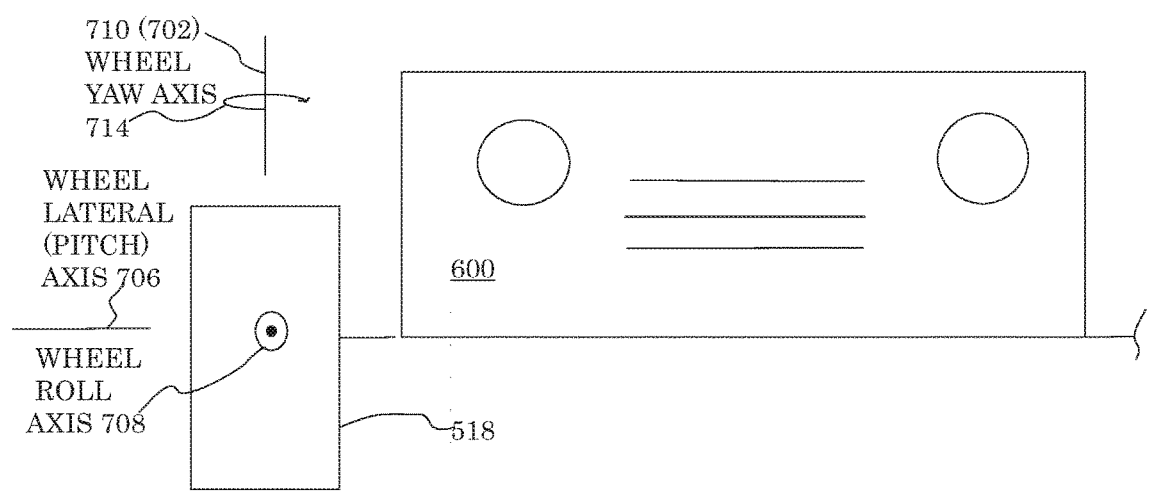
FIGS. 7A and 7B are cross-sectional views of a wheel.
Figure 7B:
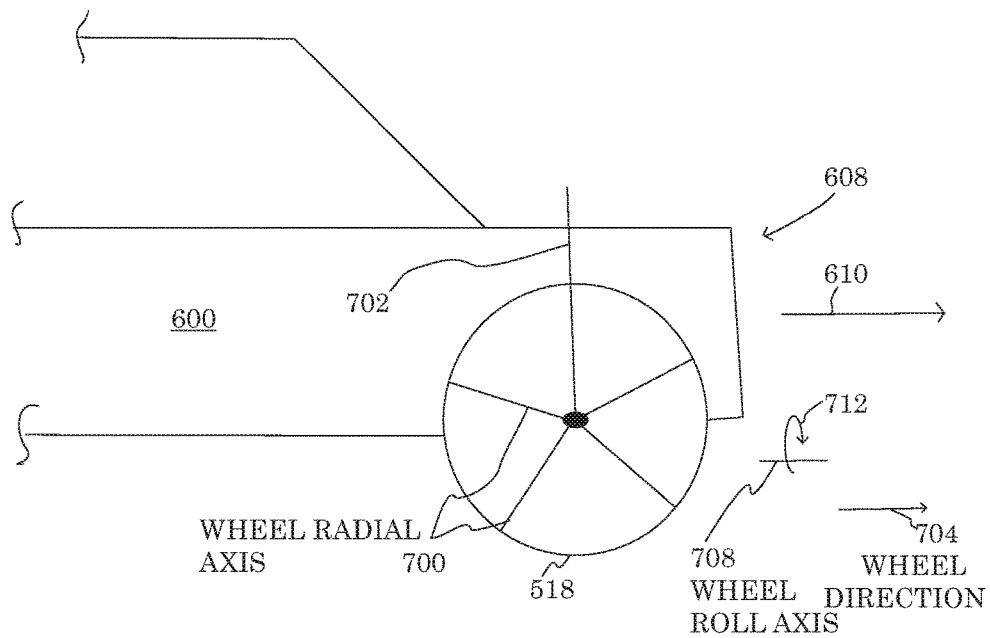

FIGS. 7A and 7B are cross-sectional views of a wheel. In this example, a front wheel is shown on the right-hand side of the driver. The wheel 518 has a radial axis 700. More explicitly, the wheel many be said to have a plurality of radial axes, which may be envisioned as spokes of a wheel, or alternatively, a single radial axis (spoke) that rotates. In one particular instance the radial axis 700 is aligned in the nominal vertical direction 702, which is also the wheel yaw axis 710. In another aspect, it can be said that the rotating radial axis forms a two-dimensional plane defined by the wheel roll axis 708 and the wheel nominal vertical direction 702 (i.e., the wheel yaw axis 710). From yet another perspective, the radial axis may be said to coincide with the roll axis once per wheel revolution, and coincide with the yaw axis of the wheel once per revolution. Taking into account just the translational movement of the wheel, without consideration of wheel rotation, there exists a wheel direction of travel 704 (when the vehicle 600 is moving) which is aligned with the wheel roll axis 708. However, it should be noted that if the vehicle is making a turn, any averaged correspondence between the wheel direction and vehicle direction may change. In summary, the wheel has a lateral or pitch axis 706, a radial axis 700, a roll axis 708, and a yaw axis 710. As explained in more detail below, rotational forces 714 can be measured about the wheel yaw axis 710. These axes are intended to define the motion of a wheel as a spinning object with a transverse (e.g., forward) motion.

As is well known in the art, a gyroscope measures a rate of rotation about an axis, which when integrated, provided an angle measurement. As such, the application accepts gyroscope measurements, finds a wheel angle measured with respect to the roll axis 708 of the wheel 518, and in response to finding the wheel angle, determines the slip angle for wheel alignment analysis, or an instantaneous wheel angle for predicting vehicle movement. Although the description provided herein references just a single wheel, it should be understood that the system may simultaneously monitor several vehicle wheels.

Figure 8:
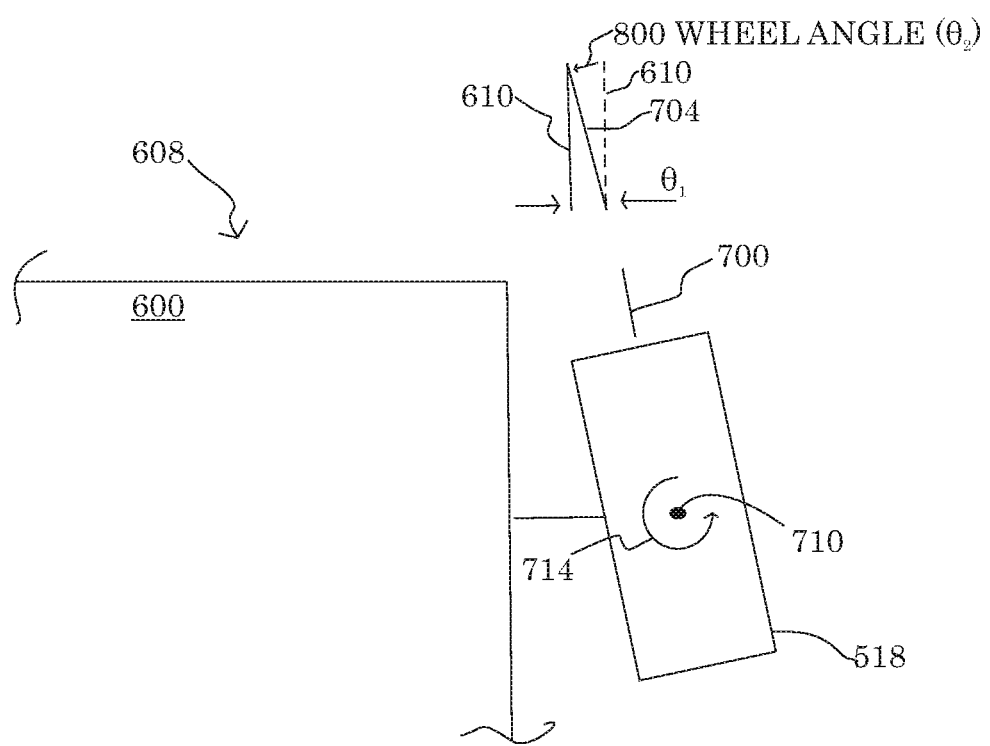
FIG. 8 is a detailed plan view depicting a wheel angle measured by gyroscope.

FIG. 8 is a detailed plan view depicting a wheel angle measured by gyroscope. Again, the front right wheel is used as an example shown with an exaggerated toe-in alignment, or the vehicle making a left-hand turn. In this case, the application finds the yaw rotation 714 about the yaw axis 710 (coming out of the page) of the wheel 518, where a change in yaw rotation changes the direction of wheel travel or indicates a change in the direction of wheel travel. The application then finds a wheel angle 800 ($\Phi_2$) defined between the direction of wheel travel 704 and the direction of vehicle travel 610. Note: $\Phi_2 = 90° - \Phi_1$. It should also be noted that if the slip angle is zero, the wheel direction is identical to the vehicle direction, and a gyroscope mounted to the wheel 518 should measure, on average, no rotation force about the wheel yaw axis 710.

Figure 9A:
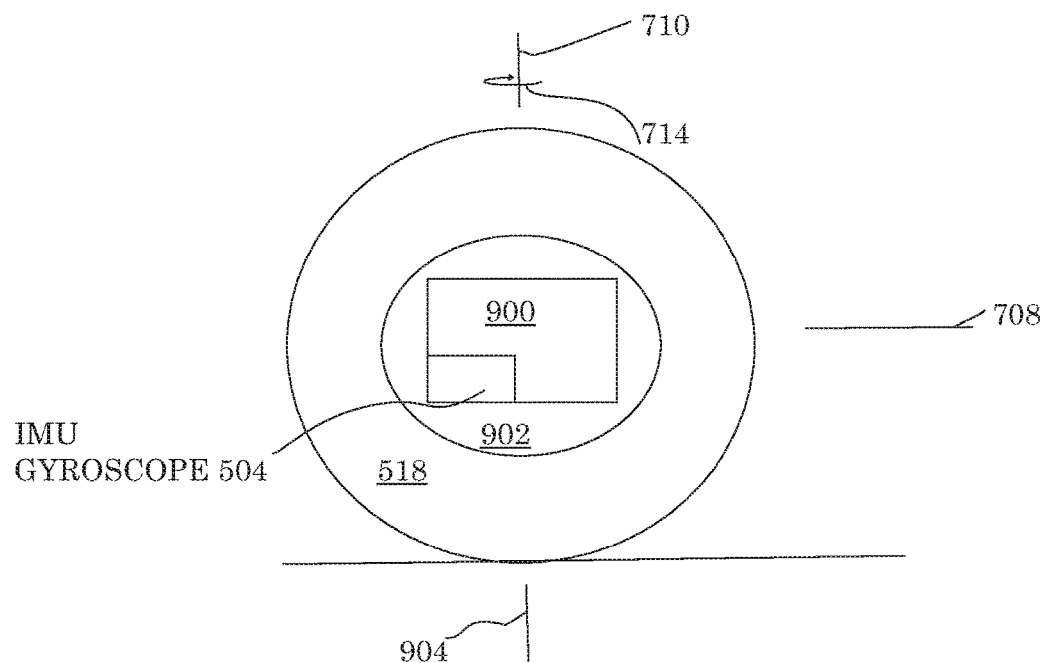
FIGS. 9A and 9B are orthogonal cross-sectional views of the gyroscope as mounted on a non-rotating portion of the wheel.
Figure 9B:
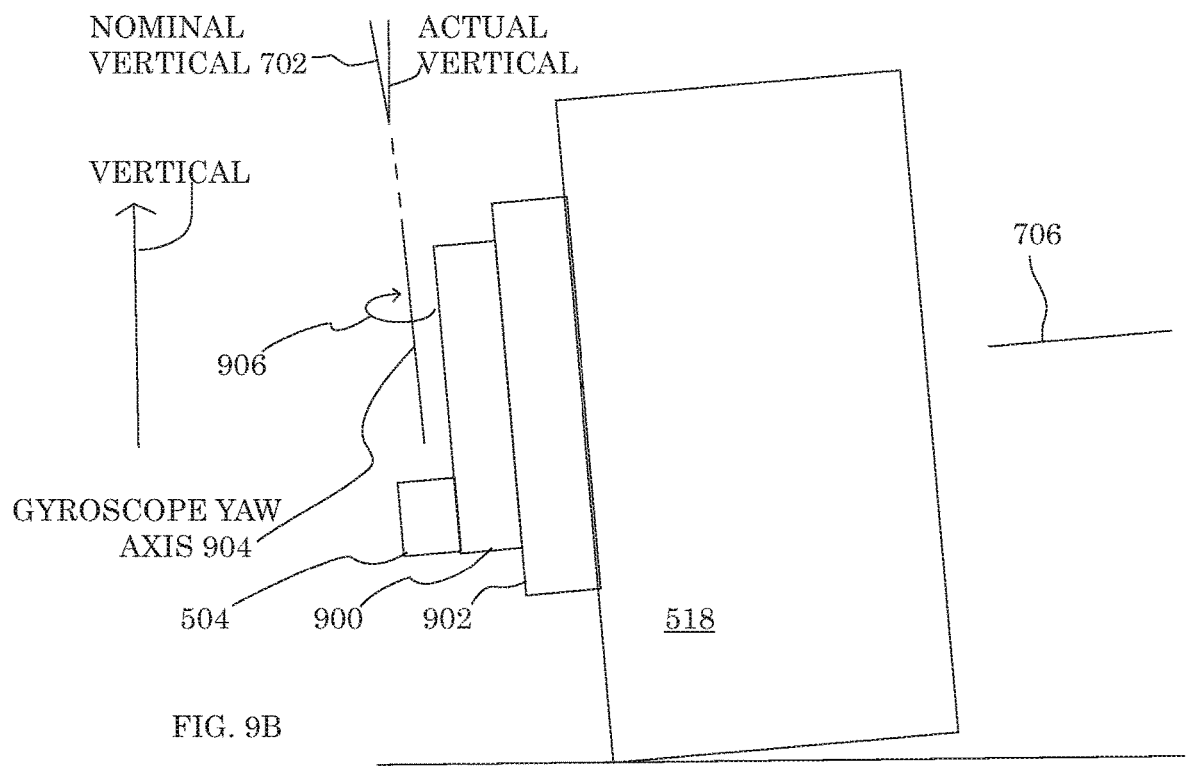

FIGS. 9A and 9B are orthogonal cross-sectional views of the gyroscope as mounted on a non-rotating portion of the wheel. Despite the many differences between manufacturers and models, a wheel assembly typically includes a hub acting as an interface between the axle and the bearings upon which the tire rotates. In the case of a front wheel for example, at least a portion of the hub is non-rotating, while retaining a fixed relationship with the radial, roll, and lateral axes of the wheel. To simplify explanations, this portion of the hub is referred to herein as the non-rotating portion 900 of the wheel 518. Also for simplicity it is assumed that the mounting surface of the non-rotating portion 900 is formed in a plane parallel to the yaw axis (nominal vertical direction 702) of the wheel, and retains this parallel relationship despite the slip angle, camber angle, and the direction in which the wheel is steered. In the event that the plane of the non-rotating portion 900 is not parallel to the wheel yaw axis, the difference can be compensated through calibration.

FIG. 9B depicts the inside surface of wheel 518 and shows the non-rotating portion 900 of the wheel (hub), a rotating portion 902 of the hub, and an IMU gyroscope 504 mounted on the non-rotating portion of the wheel. The gyroscope 504 has a yaw axis 904 aligned in the nominal vertical direction 702, orthogonal to the lateral axis 706 of the wheel 518 and orthogonal to the roll axis 708 of the wheel. Note: if the wheel has a zero camber angle, the gyroscope yaw axis is aligned in the true vertical direction. Integrating the rate of rotation 906 about gyroscope yaw axis yields the wheel angle (800, see FIG. 8), with the sign of the angle indicating either toe-in (or instantaneously measured left turn) or toe-out (or instantaneously measured right turn).

Figure 1A:
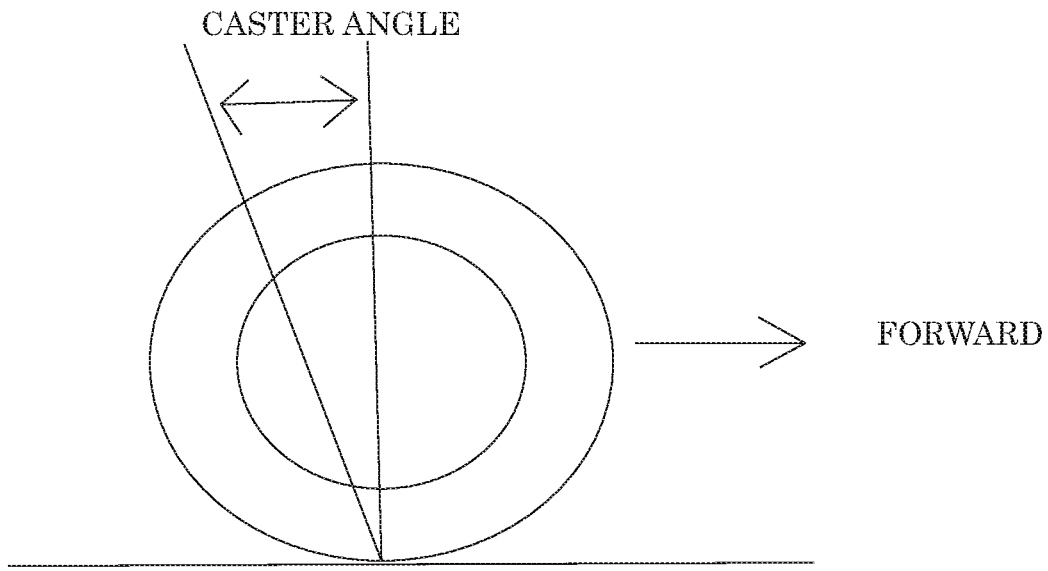
FIGS. 1A, 1B, and 1C respectively depict the elements of caster angle, camber angle, and toe, the three primary components of tire alignment (prior art).
Figure 1B:
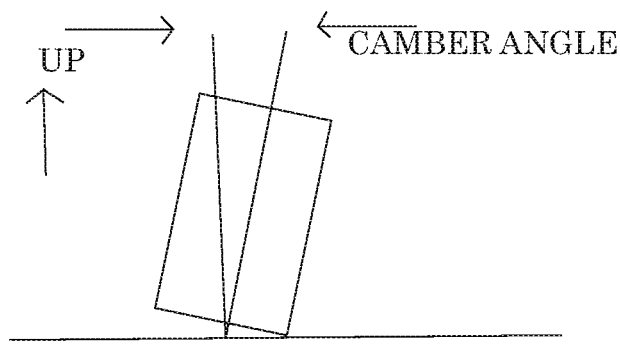
Figure 1C:
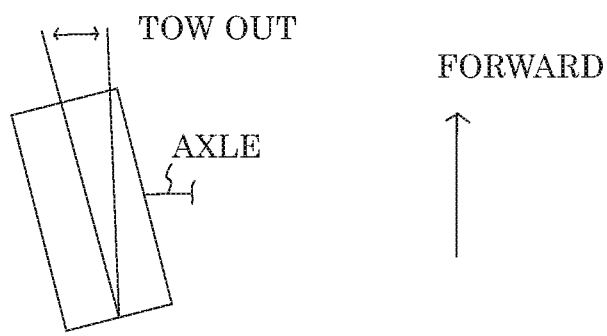
Figure 2:
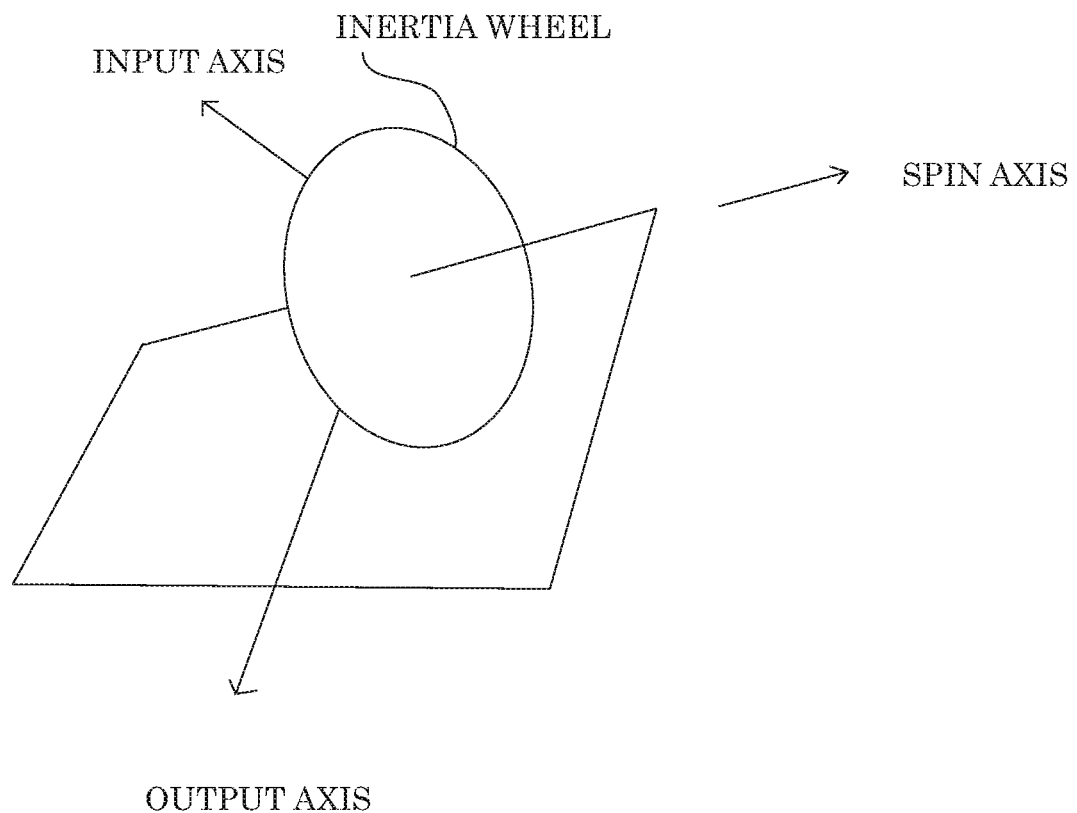
FIG. 2 is a schematic block diagram of a rate gyroscope (prior art).
Figure 3:
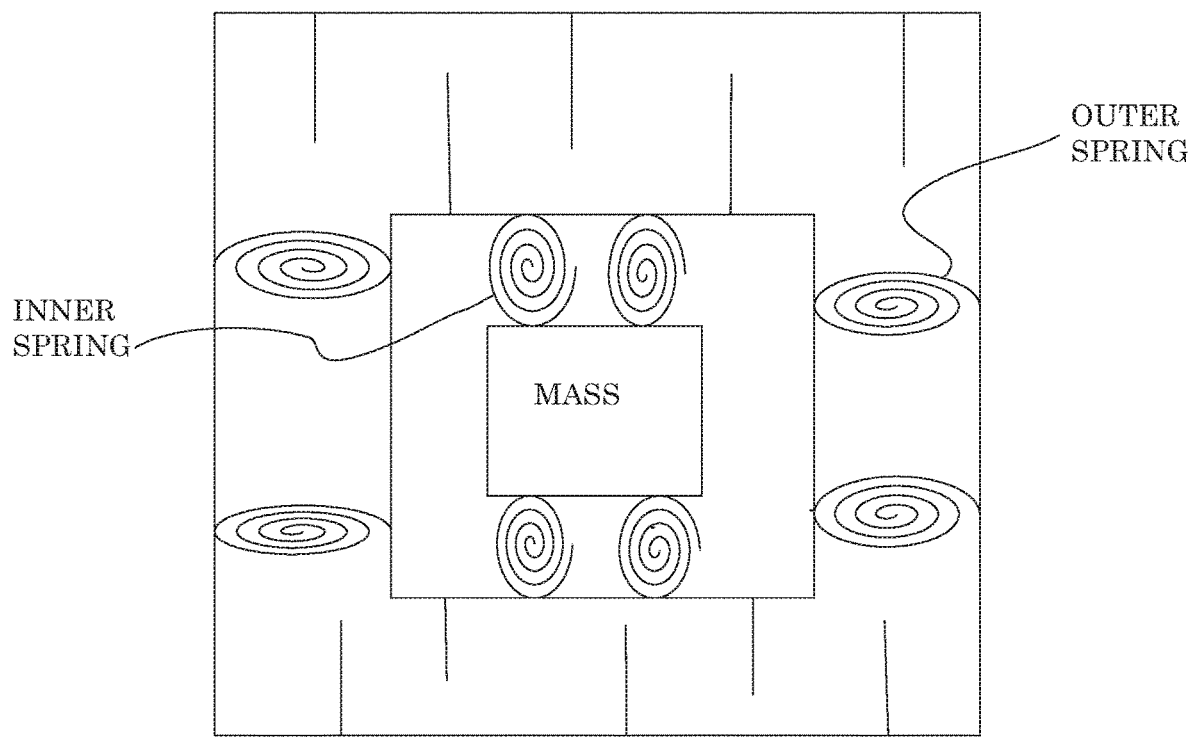
FIG. 3 is a schematic block diagram of an exemplary single-axis micro-machined electro-mechanical systems (MEMS) vibrating structure gyroscope (prior art).
Figure 4:
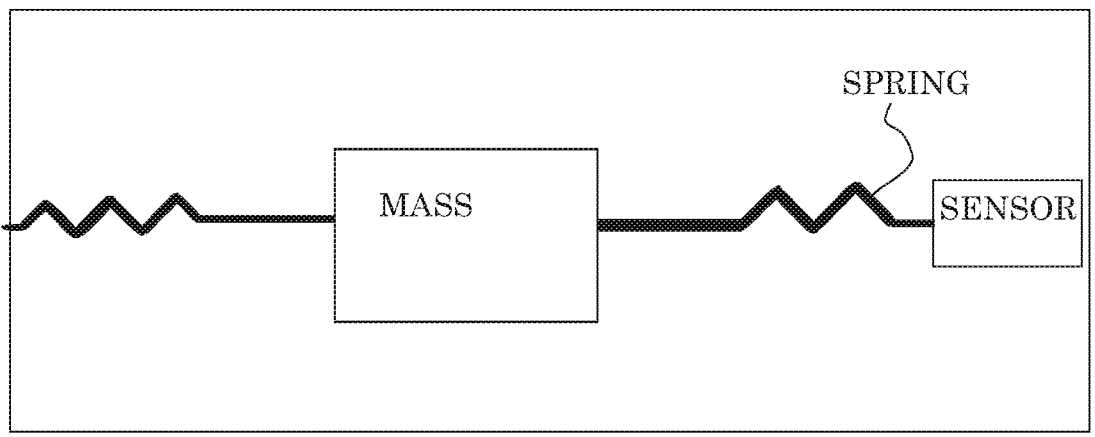
FIG. 4 is a schematic block diagram depicting an exemplary single-axis accelerometer (prior art).
Figure 10A:
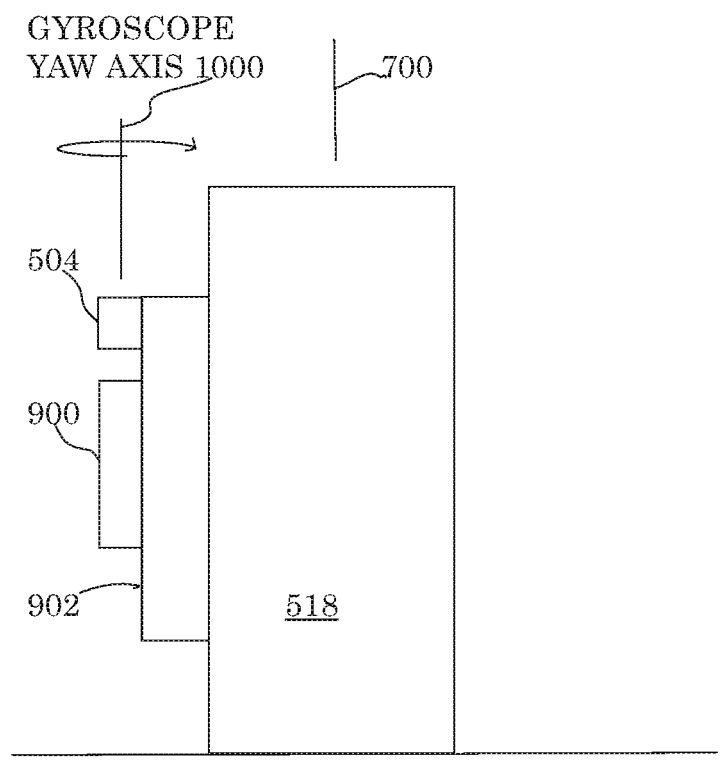
FIGS. 10A and 10B are orthogonal cross-sectional views of a wheel with the gyroscope mounted on a rotating portion of the wheel.
Figure 10B:
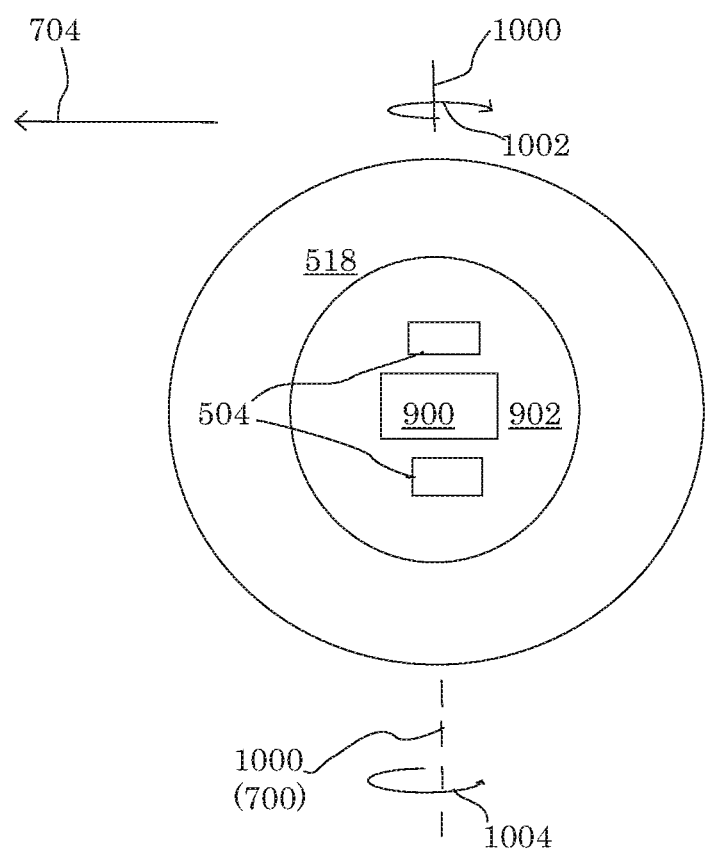

FIGS. 10A and 10B are orthogonal cross-sectional views of a wheel with the gyroscope mounted on a rotating portion of the wheel. As shown, the IMU with gyroscope 504 is mounted on the rotating portion of the hub 902, but alternatively, it could be mounted on a tire surface, in the tire valve stem, or wheel rim. For simplicity of explanation it is assumed that the gyroscope yaw axis 1000 aligned with (i.e., parallel to) the radial axis 700 of the wheel 518. However, this relationship is not necessary, and any differences in axis alignment can be handled with calibration measurements. For every rotation of the wheel 518 the application finds a peak yaw rotation by measuring a maximum yaw rotation 1002 (e.g., when the IMU 504 is rotated to a position above the non-rotating portion as shown), a minimum yaw rotation 1004 (e.g., when the IMU is rotated to a position below the non-rotating portion as shown), or both minimum and maximum yaw rotations about the yaw axis of the wheel, and determines the wheel angle using the peak yaw rotation. The maximum and minimum yaw rotation measurements occur when the gyroscope yaw axis is orthogonal to the direction of wheel travel 704. Alternatively stated, the maximum and minimum yaw rotation measurements occur when the gyroscope input axis (see FIG. 2) is aligned with (and against) the direction of wheel travel 704. The terms "maximum" and "minimum" are arbitrary as they should yield the same measurement with a different sign value. Thus, the maximum yaw rotation 1002, minimum yaw rotation 1004, or average of the two may be used to determine the peak value. Integrating the peak rate of rotation (yaw rotation) about gyroscope yaw axis yields the wheel angle, with the sign of the angle indicating either toe-in (or instantaneous left turn) or toe-out (or instantaneous right turn). In some aspects, the initial position of the gyroscope with respect to the wheel must be known to correlate the measured wheel angle sign with wheel left (in) and right (out).

One relatively simple means of determining an out-of-alignment toe condition is to take initial gyroscope measurements with the wheel in a predetermined alignment to find an initial wheel angle, so that an out-of-alignment condition is determined when a measured (average) wheel angle differs from the initial wheel angle by a predetermined amount. The predetermined alignment may be the correct or desired alignment, and may include offsets or adjustment to compensate for differences between gyroscope and wheel axes.

As noted above, the slip angle measurements are made under the assumption that the relationship between the vehicle and wheel directions is relatively constant. For example, the measurements may made be made under the condition that the vehicle is moving in a straight line for an extended period of time, or that the measurements are averaged over an extended period of time. However, more instantaneous gyroscope measurements can be used to determine the instantaneous angle of the wheel with respect to the vehicle, for example, while the vehicle is making a turn. With the advent of computer aided or self-steering vehicles, knowing the instantaneous wheel angle with respect to the vehicle and vehicle direction makes prediction of vehicle movement more accurate and corrections more rapid. Further, for vehicles equipped with mechanisms for in-situ slip and camber angle adjustment, such instantaneous wheel angle measurements provide a feedback path to aid in, for example, more responsive steering or prolonging tire wear.

Returning briefly to FIG. 5, the in-situ vehicle wheel position determination system may use an IMU 502 comprising an accelerometer 1300 mounted on a wheel 518 of a vehicle, having an output on line 506 to supply accelerometer measurements. The IMU 502 may comprise only accelerometer 1300, only a gyroscope 504 (as described above), both the gyroscope and accelerometer, or multiple gyroscopes and accelerometers. The application 512 compares the acceleration on the vehicle to the accelerometer measurements to determine a wheel alignment condition or instantaneous wheel position. The axes designations used to describe the gyroscope aspects of the system are also used to describe the accelerometer aspects.

Figure 13:
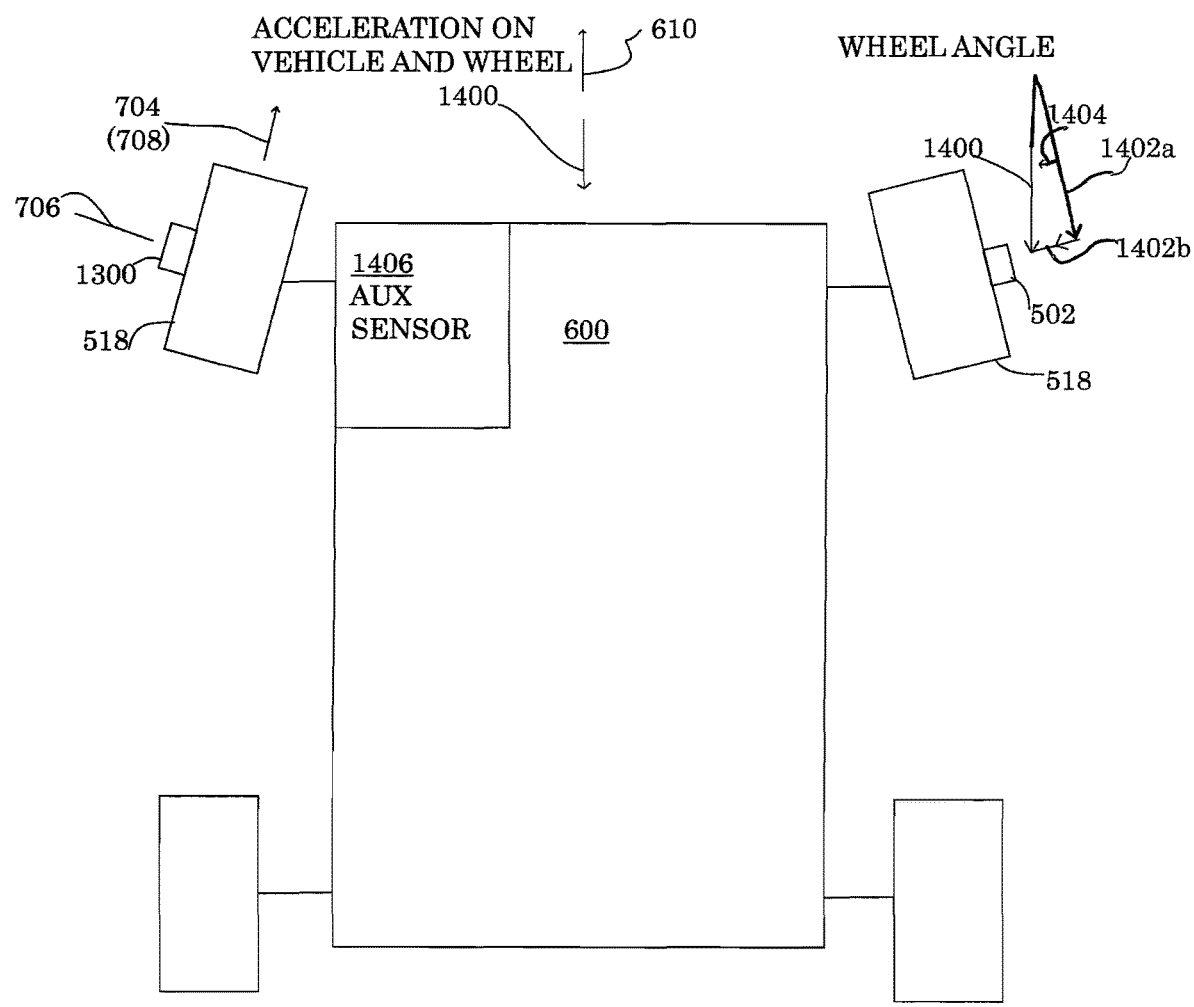
FIG. 13 is a diagram depicting acceleration forces on a vehicle and a wheel.

FIG. 13 is a diagram depicting acceleration forces on a vehicle and a wheel. The application accepts acceleration measurements on the vehicle in the vehicle direction, expressed as vector 1400, and may accept accelerometer measurements, expressed as vectors 1402*a* and 1402*b*, as the vehicle is traveling, where vehicle travel is defined by a change in vehicle geographic position. It could also be said that acceleration forces on the vehicle (and wheel) oppose the vehicle direction. The acceleration on the wheel 518 can be broken into a component 1402*a* aligned with the wheel roll axis 708 and a component 1402*b* aligned with the wheel lateral axis 706. The application compares the acceleration on the vehicle to the wheel accelerometer measurements to find a wheel angle 1404 between the direction of vehicle travel 610 and the direction of wheel travel 704, to determine a wheel toe alignment or instantaneous wheel angle useful in the prediction of vehicle movement.

Figure 14:
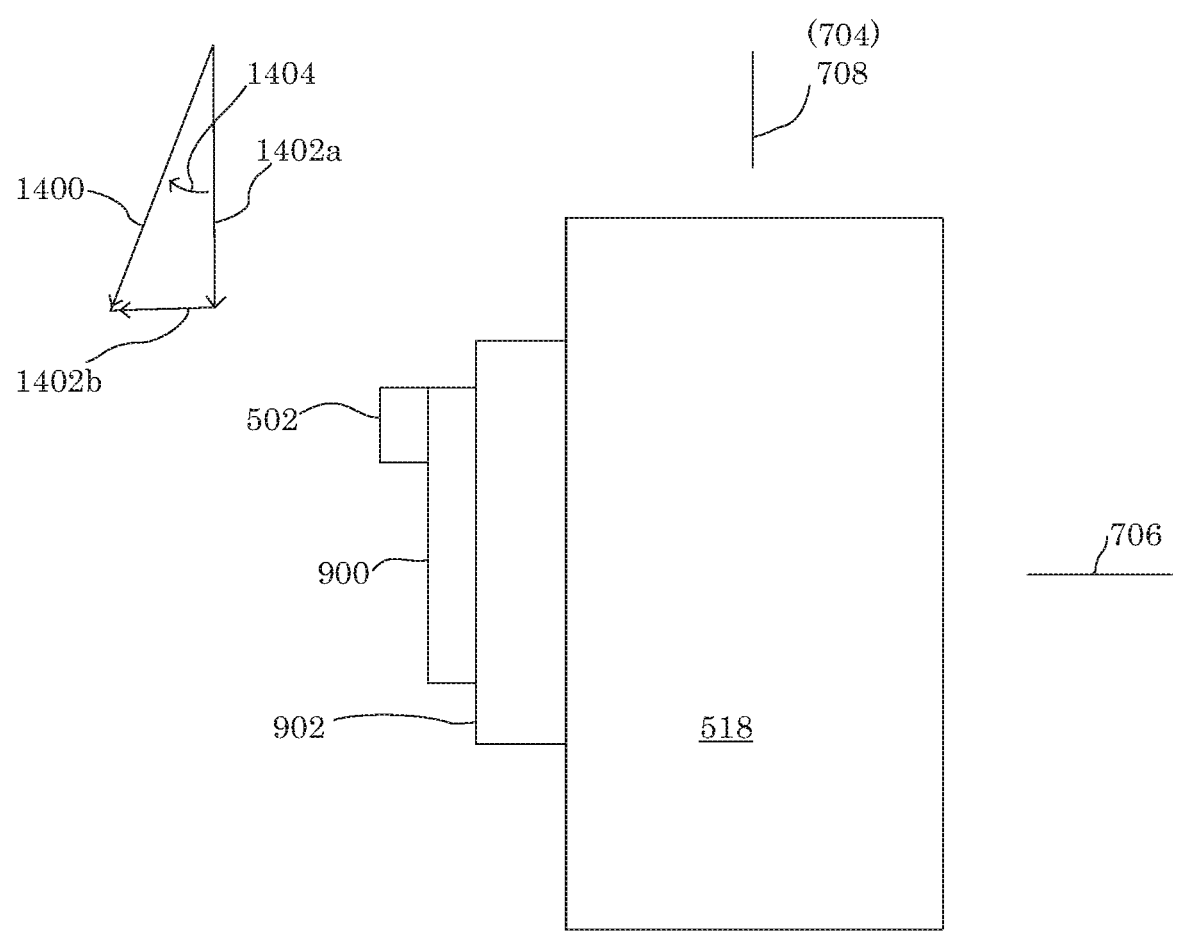
FIG. 14 is a plan view of an IMU with an accelerometer mounted on a non-rotating portion of the wheel to measure wheel angle.

FIG. 14 is a plan view of an IMU 502 with an accelerometer mounted on a non-rotating portion 900 of the wheel 518 to measure wheel angle. The IMU accelerometer may be aligned along either the lateral axis 706 of the wheel or the roll axis 708 of the wheel. As used herein, the terms "aligned along" or "aligned with" a particular axis or direction signifies that the accelerometer maximally measures acceleration in that axis or direction. Assuming a small non-zero slip angle, a majority of the acceleration on the wheel should be along the wheel roll axis 708. Knowing the acceleration along the wheel roll axis 708 for example (1402*a*) and the acceleration on the vehicle (1400), the third side of the vector triangle, acceleration along the wheel lateral axis 706 (1402*b*), and wheel angle 1404 can be calculated using trigonometry.

Returning briefly to FIG. 13, the acceleration on the vehicle represented by vector 1400 can be measured using an auxiliary sensor 1406 mounted on vehicle 600. The auxiliary sensor 1406 may be a vehicle-mounted accelerometer aligned along the direction of vehicle travel or more than one vehicle-mounted accelerometer, a vehicle speedometer configured to calculate acceleration, the combination of a first accelerometer mounted on the wheel aligned along the lateral axis with a second accelerometer mounted on the wheel aligned along the roll axis of the wheel (as explained below), a GPS receiver mounted to the vehicle, or combinations of these devices.

In one aspect, the auxiliary sensor is not required. Returning to FIG. 14, the IMU 502 may comprise a first accelerometer and a second accelerometer, with the first accelerometer aligned along the lateral axis 706 of the wheel and the second accelerometer aligned along the roll axis 708 of the wheel. The application uses the first accelerometer and second accelerometer to measure the acceleration on the wheel, and using trigonometry, finds the acceleration on the vehicle by summing the first and second accelerometer measurements of the first acceleration, and thus finds the wheel angle 1404.

Figure 15:
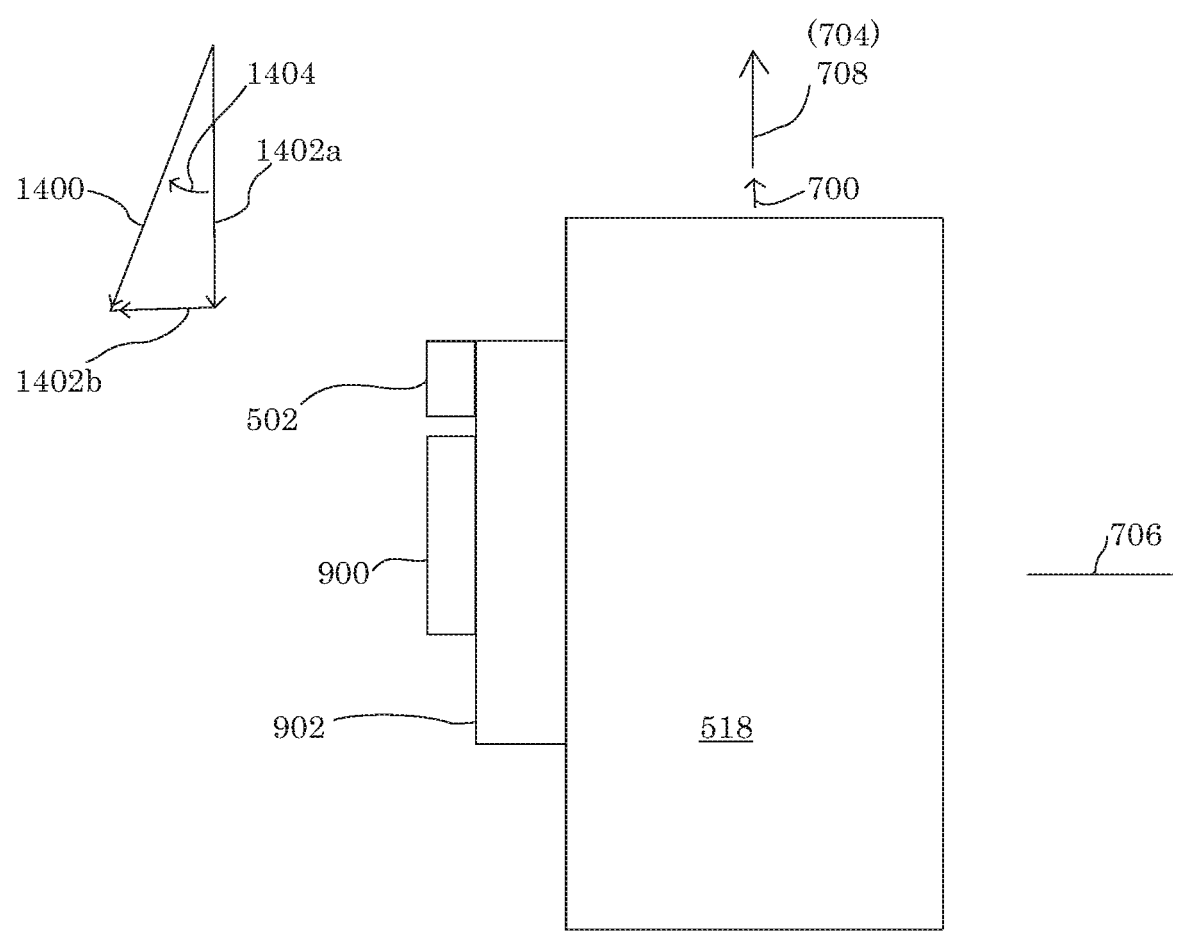
FIG. 15 is a plan view depicting the IMU accelerator mounted on a rotating portion of the wheel to measure wheel angle.

FIG. 15 is a plan view depicting the IMU 502 accelerator 1300 mounted on a rotating portion 902 of the wheel 518 to measure wheel angle. In this aspect, the IMU 502 with accelerator is aligned along the lateral axis 706. If mounted along the lateral axis, the measurement is described as in the explanation of FIG. 14, where vector 1402*b* is compared to vector 1400 to find vector 1402*a* and the wheel angle 1404. Alternatively, if the accelerometer is aligned with the radial axis 700 of the wheel, the measurement is more complicated, as the accelerometer may also measure forces associated with gravity and angular acceleration. In one aspect, these undesired measurements are subtracted-out or canceled using a peak accelerometer measurement by measuring a maximum accelerometer measurement (when the wheel radial axis 700 is aligned with the wheel roll axis 708) and a minimum accelerometer measurement (a half wheel rotation from the maximum second accelerometer measurement). Otherwise, assuming the forces due to gravity on a rotating wheel are self-canceling, measured forces due to angular acceleration or angular velocity can be calculated and removed from the accelerometer measurements knowing the vehicle acceleration or velocity, and the distance (radius) from the accelerometer to the wheel center. In one aspect, two accelerometers can be used to measure forces along the wheel lateral and radial (peak measurements) axes and summed to supply a measurement of acceleration on the vehicle.

To measure the camber angle, the accelerometer is aligned orthogonal to the wheel lateral axis, and the application compares the accelerometer measurements to gravity (1G), as measured along a true vertical axis, to find a camber angle defined between true vertical (1G) and the radial axis of the wheel, when the radial axis is aligned in a nominal vertical direction.

Figure 16:
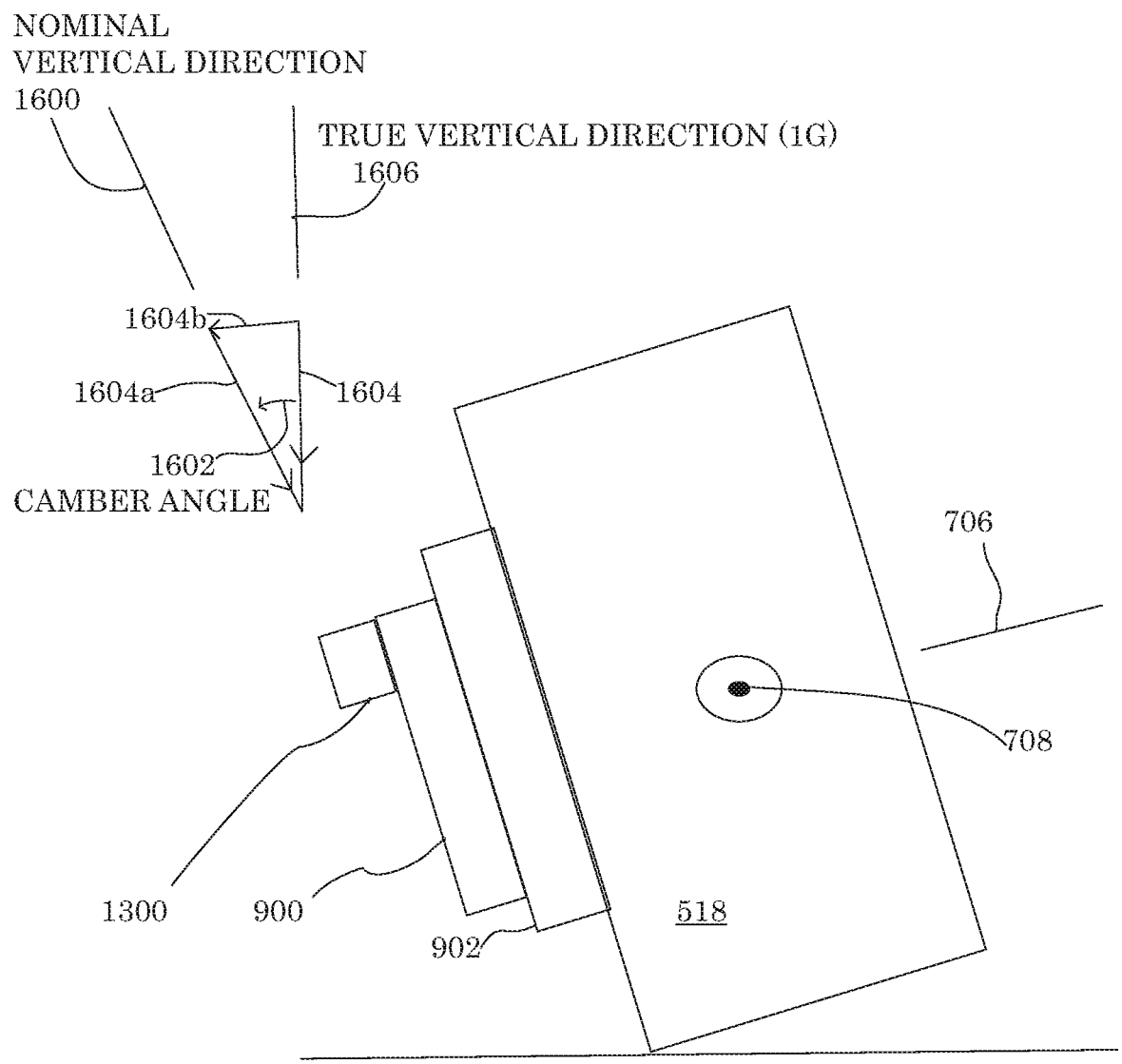
FIG. 16 is a diagram depicting the accelerometer mounted on a non-rotating portion of the wheel to measure camber angle.

FIG. 16 is a diagram depicting the accelerometer mounted on a non-rotating portion of the wheel to measure camber angle. The accelerometer is aligned in a nominal vertical direction 1600, orthogonal to the lateral axis 706 of the wheel 518 and orthogonal to a roll axis 708 of the wheel (coming out of the page). The difference between the nominal vertical direction 1600 and true vertical (1G) direction 1606 defines the camber angle 1602. The force of gravity is known, and is represented by vector 1604. The force association with gravity when the accelerometer 1300 is aligned in the nominal vertical direction is measured and is represented by vector 1604*a*. The third side of the vector triangle represented by vector 1604*b* is calculated using trigonometry, as is the camber angle 1602. Note: this measurement can be made with the vehicle stationary or in motion. Further, the measurement may be averaged or instantaneous.

Figure 17:
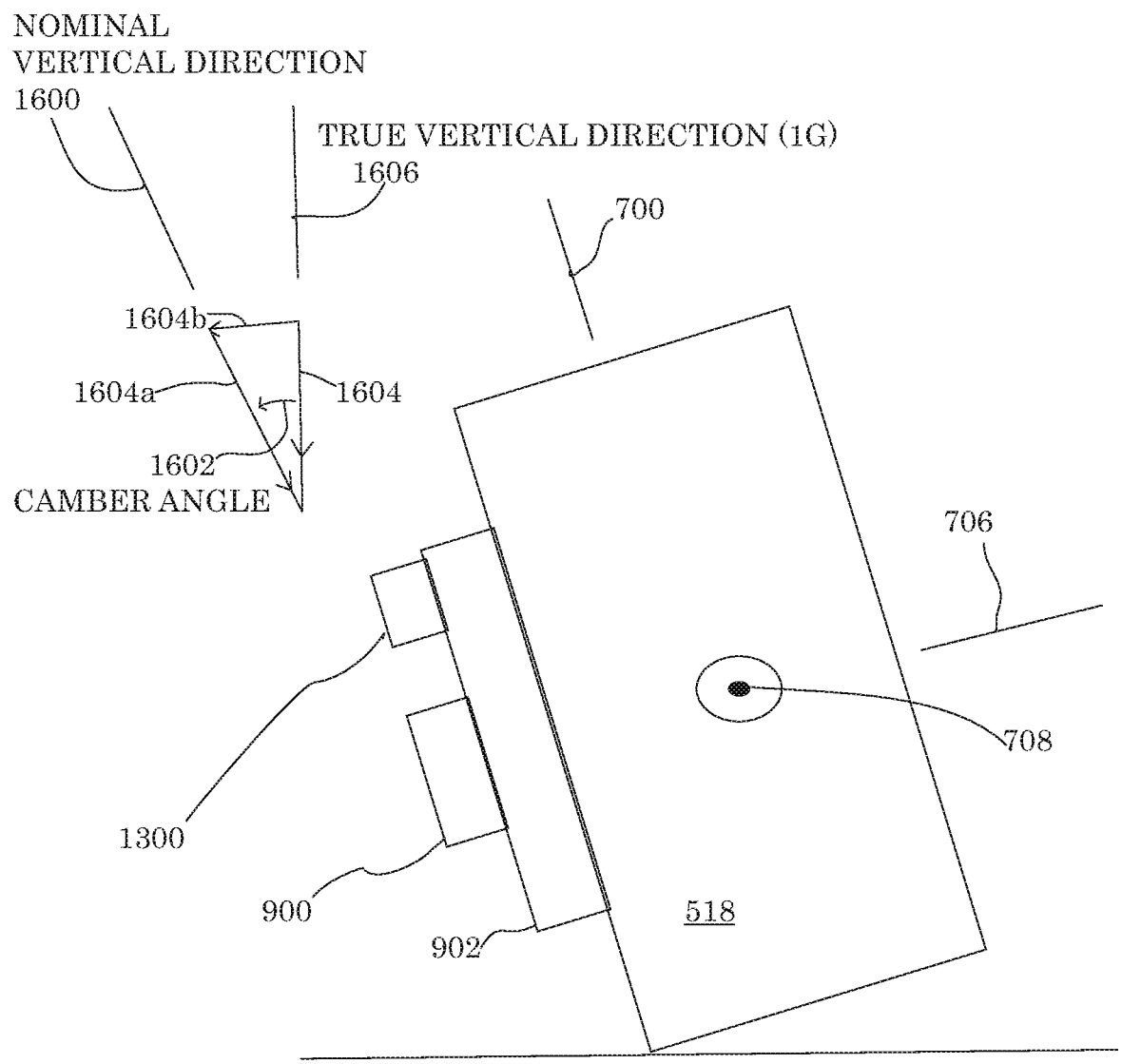
FIG. 17 is a diagram depicting the accelerometer mounted on a rotating portion of the wheel, aligned along a radial axis of the wheel to measure camber angle.

FIG. 17 is a diagram depicting the accelerometer 1300 mounted on a rotating portion 902 of the wheel, aligned along (parallel to) the radial axis 700 of the wheel 518 to measure camber angle. Ideally, the accelerometer should align with the nominal vertical direction 1600 to measure the camber angle 1602. However, since the accelerometer 1300 is rotating with the wheel 518, it only aligns with the nominal vertical direction once per revolution. Thus, the application accepts accelerometer measurements, in a plurality of instances subsequent to a corresponding plurality of vehicle movements, when the wheel is stationary, and determines a maximum accelerometer measurement, represented by vector 1604*a*. It is assumed that with enough measurements the accelerometer will eventually align with the nominal vertical direction 1600 on at least one occasion. The application compares this maximum accelerometer measurement to gravity (1 G, represented by vector 1604), to find camber angle 1602. Note: equivalent results can be found using the minimum accelerometer measurement and comparing it to zero. Again, if the accelerometer (or gyroscope) is not aligned with the radial, roll, or lateral axes of the wheel, which may also be referred to herein as "true" axes, the differences between accelerometer (or gyroscope) axes and wheel axes can be accounted for through calibration or then use of multiple orthogonally aligned accelerometers (or gyroscopes).

In one aspect, the application accepts an initial accelerometer measurement with the wheel in a predetermined alignment (slip or camber angle), and determines an out-of-alignment condition when the initial accelerometer measurement differs from subsequent accelerometer measurements by a predetermined amount. It may not always be possible to perfectly align the accelerometer (or gyroscope) in the optimal axis, orientation, or direction. One solution is the find the calibration (misalignment) angle, and factor this calibration angle into the measurements or calculations. In a related variation, the application may accept initial accelerometer (or gyroscope) measurements with the wheel having a known zero slip angle or camber angle. Then, the accelerometer or gyroscope misalignment can be mechanically adjusted, or the measured misalignment factored into the measurements and calculations.

In another aspect, a single acceleration measurement may be made using two or three orthogonally aligned accelerometers if one accelerometer cannot be perfectly aligned in an intended axis or direction, with the assumption that the intended acceleration measurement can be determined by summing the multiple orthogonal accelerometer measurements. This same principle of, using two or three orthogonally aligned gyroscopes, can also be applied to the measurement of a rate of rotation about an intended axis.

In one aspect, the IMU may comprise one or more accelerometers and one or more gyroscopes, combined for the purposes of calibration, refinement of data, and ease of calculation. A conventional gyroscope measures angular rotation speed, and has non-zero bias offset that jitters and varies with sensor temperature. Over time, the bias offset creates integration errors. A conventional accelerometer measures the direction of sensor acceleration, but it cannot distinguish between gravity and inertial acceleration (i.e., an axiom of General Relativity). Therefore, the measurement of slip angle, for example, using both an accelerometer and gyroscope may be useful in providing calibration and reference measurements. In one aspect, the gyroscope and/or accelerometer can be calibrated to remove jitter and bias errors when measurements are able to determine that the IMU is not in motion (e.g., when the vehicle is parked).

The IMU may potentially comprise a magnetometer. A conventional magnetometer measures the direction of a local magnetic field, and it cannot distinguish between Earth's field and any other nearby fields. Unfortunately, magnetometer readings also typically include significant noise, and they may be influenced by metal in the wheel and vehicle.

As noted above, the slip angle measurements made using the accelerometer are made under the assumption that the relationship between the vehicle and wheel directions is relatively constant. For example, the measurements may be made under the condition that the vehicle is moving in a straight line for an extended period of time, or the measurements may be averaged over an extended period of time. However, more instantaneous accelerometer measurements can be used to determine the instantaneous angle of the wheel with respect to the vehicle, for example, while the vehicle is making a turn. With the advent of computer aided or self-steering vehicles, knowing the instantaneous wheel angle with respect to the vehicle and vehicle direction makes prediction of vehicle movement more accurate than simply measuring vehicle movement, so that corrections can be made more rapidly. Further, vehicles equipped with mechanisms for in-situ slip and camber angle adjustment may use wheel angle measurements as feedback data to aid in more responsive steering or prolonging tire wear.

Figure 11:
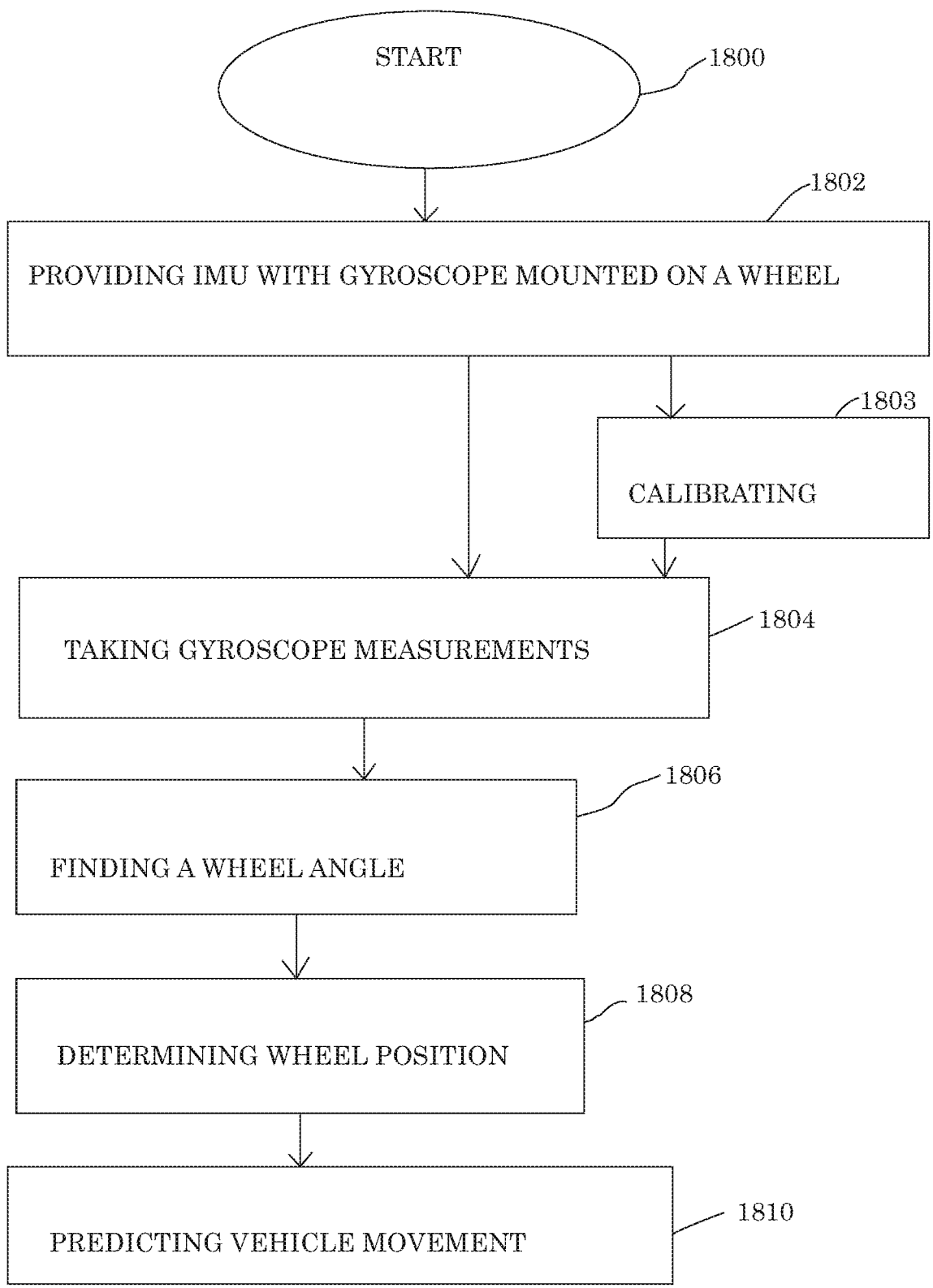
FIG. 11 is a flowchart illustrating a method for the in-situ determination of vehicle wheel position using an IMU.

FIG. 11 is a flowchart illustrating a method for the in-situ determination of vehicle wheel position using an IMU. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1800.

Step 1802 provides an IMU comprising a gyroscope, mounted on a wheel of a vehicle. Step 1804 takes gyroscope measurements. Using the gyroscope measurements, Step 1806 finds a wheel angle measured with respect to a roll axis of the wheel (the direction of wheel travel). In response to finding the wheel angle, Step 1808 determines the wheel position with respect to the vehicle. In one aspect, Step 1806 finds an average wheel angle and Step 1808 determines a wheel alignment toe condition. In another aspect, Step 1806 finds an instantaneous wheel angle and Step 1810 predicts subsequent wheel positions and vehicle movement in response to determining the wheel position in Step 1808.

In one aspect, Step 1803 takes initial gyroscope measurements with the wheel in a predetermined alignment to find an initial slip wheel angle. Then, Step 1808 determines an out-of-alignment condition when the determined slip wheel angle differs from the initial slip wheel angle by a predetermined amount.

In one aspect, taking gyroscope measurements in Step 1804 includes finding a yaw rotation about a yaw axis of the wheel, where a change in yaw rotation changes (indicates a change in) the direction of wheel travel. Step 1806 finds a wheel angle defined between the direction of wheel travel and the direction of vehicle travel. Again, Step 1806 may determine an average wheel angle so that Step 1808 determines a toe alignment condition for the wheel. Otherwise, Step 1806 determines the instantaneous wheel angle.

If Step 1802 mounts the gyroscope on a non-rotating portion of the wheel, the gyroscope may have a yaw axis aligned in a nominal vertical direction, orthogonal to the roll axis of the wheel and orthogonal to a lateral (pitch) axis of the wheel. In one aspect, Step 1803 calibrates the gyroscope to account for differences between the gyroscope yaw axis alignment in the nominal vertical direction and a true vertical direction (1 G). See the explanation of FIGS. 9A and 9B for details.

If Step 1802 mounts the gyroscope on a rotating portion of the wheel, the gyroscope has a yaw axis aligned with the radial axis of the wheel. For every rotation of the wheel, Step 1804 finds a peak yaw rotation in response to measuring a maximum yaw rotation and/or a minimum yaw rotation about the yaw axis of the wheel, and Step 1806 finds the wheel angle using the peak yaw rotation. See the explanation of FIGS. 10A and 10B for details.

In another aspect, Step 1803 takes gyroscope calibration measurements while the wheel is rotating, with the vehicle stationary (e.g., mounted on a lift or conveyor belt track). For every rotation of the wheel, Step 1804 finds a peak yaw calibration rotation by measuring a maximum yaw rotation calibration and/or a minimum yaw rotation calibration about the yaw axis of the wheel, and Step 1806 modifies a measured the slip angle using the peak yaw calibration rotation. Generally, Step 1803 calibrates the gyroscope to account for differences between the gyroscope yaw axis alignment in a nominal radial axis of the wheel and a true radial axis of the wheel. The calibration may be a mechanical adjustment to move the gyroscope axis, or a computational offset used in measurements and calculations.

Figure 12:
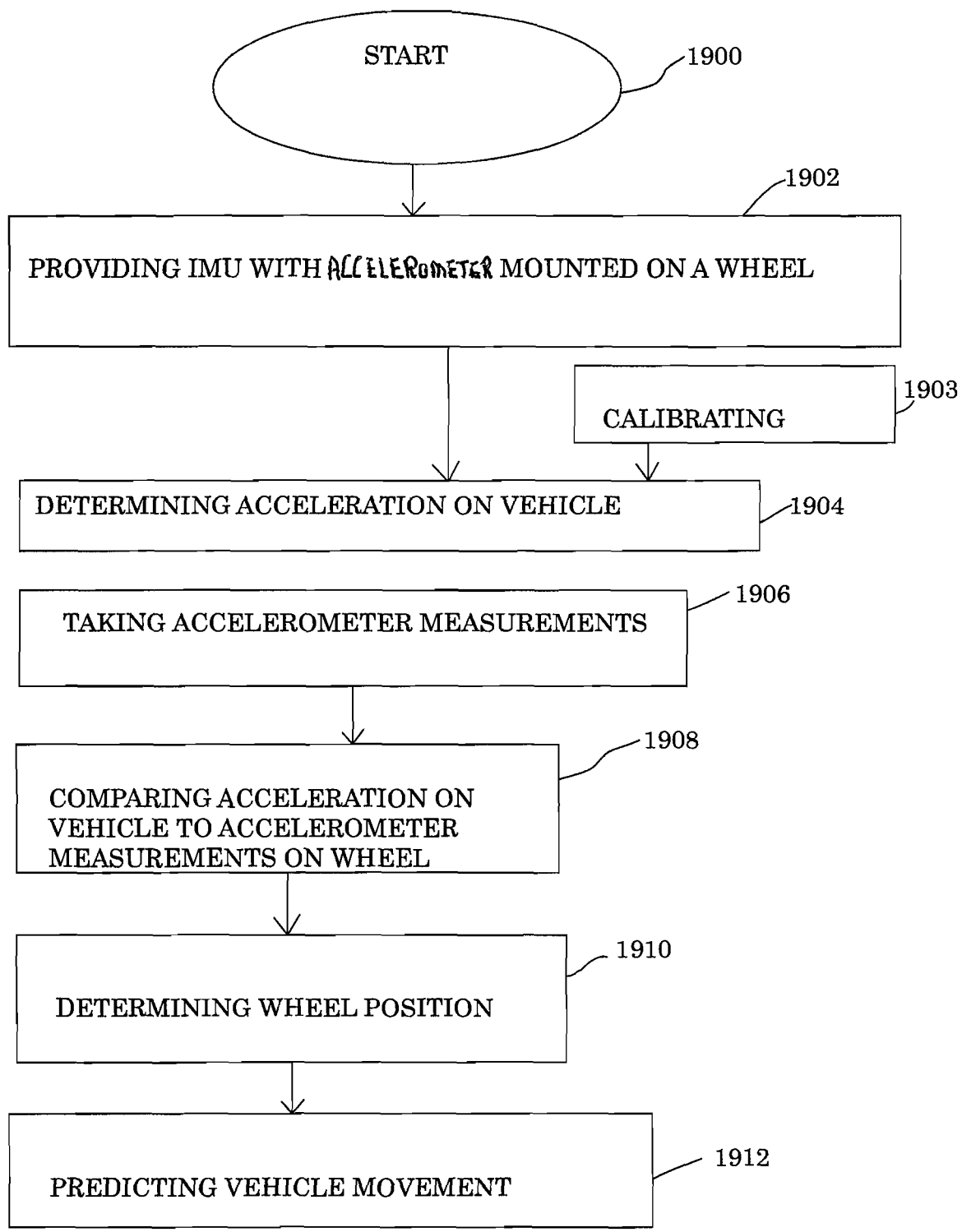
FIG. 12 is a flowchart illustrating a second method for the in-situ determination of vehicle wheel position using an IMU.

FIG. 12 is a flowchart illustrating a second method for the in-situ determination of vehicle wheel position using an IMU. The method begins at Step 1900. Step 1902 provides an IMU comprising an accelerometer mounted on the wheel of a vehicle. Step 1904 measures acceleration on the vehicle. Using the accelerometer, Step 1906 measures acceleration on the wheel. Step 1908 compares the acceleration on the vehicle to the accelerometer measurements on the wheel. In response to finding a difference between the acceleration measurements, Step 1910 determines a wheel position with respect to the vehicle. In one aspect, Steps 1904 and 1906 respectively measure average accelerations on the vehicle and wheel, and Step 1910 determines a wheel alignment condition. In another aspect, Steps 1904 and 1906 measure instantaneous accelerations, and Step 1912 predicts subsequent wheel positions and vehicle movement based upon the determined wheel position.

In one aspect, Step 1908 compares acceleration measurements when the wheel is known to have a predetermined alignment condition, and Step 1910 determines an out-of-alignment condition when the comparison of the acceleration on the vehicle differs from the accelerometer measurement by a predetermined amount. In a different aspect, Step 1903 calibrates the accelerometer to account for a difference between a nominal axis of the wheel and a true axis of the wheel. The calibration may involve a physical manipulation of the accelerometer axis or a measurement used to offset or cancel subsequent measurements and calculations.

In one aspect, Step 1904 determines acceleration in a direction of the vehicle travel. Step 1906 measures the acceleration on the wheel as the vehicle is traveling, where vehicle travel is defined by a change in vehicle geographic position.

If Step 1902 mounts the accelerometer on a non-rotating portion of the wheel, the accelerometer may be aligned along either the lateral (pitch) axis of the wheel or the roll axis of the wheel. Either alignment provides an acceleration vector along one of the wheel axes, permitting the wheel angle to be calculated using trigonometry. See the explanation of FIG. 14 for details.

In one aspect, Step 1902 mounts a first accelerometer aligned along a lateral axis of a non-rotating portion of the wheel and a second accelerometer aligned along a roll axis of a non-rotating portion of the wheel. Step 1906 uses the first accelerometer and second accelerometer to measure the acceleration on the wheel, and Step 1904 measures the first acceleration on the vehicle by summing the first and second accelerometer measurements of the first acceleration.

Otherwise, Step 1904 measures the acceleration on the vehicle using an auxiliary sensor such as a vehicle-mounted accelerometer aligned along the direction of vehicle travel. Optionally, two or three accelerometers may be orthogonally mounted on the vehicle. The auxiliary sensor may also be a vehicle speedometer (configured to calculate acceleration), a GPS receiver mounted on the vehicle, or a combination of sensors. As explained above, vehicle acceleration can also be calculated by measuring acceleration along both the wheel roll and lateral axes.

If Step 1902 mounts the accelerometer on a rotating portion of the wheel, it may be aligned with either the lateral or radial axis of the wheel. See the explanation of FIG. 15 for details. In another aspect, Step 1902 mounts a first accelerometer aligned along a lateral axis of the wheel and a second accelerometer aligned along a radial axis of the wheel. Step 1906 measures the first acceleration on the wheel using the first and second accelerometers, and Step 1904 measures the acceleration on the vehicle by summing the first and second accelerometer measurements. More explicitly, Step 1906 makes second accelerometer measurements by finding a peak accelerometer measurement by measuring a maximum second accelerometer measurement and/or a minimum second accelerometer measurement. Then, Step 1908 compares acceleration on the vehicle to the accelerometer measurements by comparing the acceleration on the vehicle to the peak accelerometer measurements on the wheel.

In a different aspect, Step 1902 aligns the accelerometer orthogonal to a lateral axis of the wheel. Step 1908 compares the accelerometer measurements to gravity (1G), and Step 1910 finds a camber angle defined between vertical direction (1G) and a radial axis of the wheel. If Step 1902 mounts the accelerometer on a non-rotating portion of the wheel, it is aligned in a nominally vertical direction, orthogonal to the lateral axis of the wheel and orthogonal to the roll axis of the wheel. See the explanation of FIG. 16 for details.

If Step 1902 mounts the accelerometer on a rotating portion of the wheel, it is aligned along the radial axis of the wheel. Step 1906 measures the acceleration on the wheel by accepting accelerometer measurements in a plurality of instances subsequent to a corresponding plurality of vehicle movements, when the wheel is stationary, and determines a maximum accelerometer measurement. Step 1910 determines the camber angle as Step 1908 compares the maximum accelerometer measurement to gravity (1 G). Alternatively, a minimum accelerometer measurement can be compared to zero. See the explanation of FIG. 17 for details.

In one aspect, with the accelerometer mounted on a rotating portion of the wheel, Step 1903 rotates the wheel in a condition where the wheel is known to have a zero camber angle, and calibrates the accelerometer alignment to read a zero peak accelerometer measurement. If the accelerometer is mounted on a non-rotating portion of the wheel, the same calibration can be made without rotating the wheel.

An IMU system and method have been provided for measuring wheel alignment and instantaneous wheel position with respect to a vehicle. Examples of particular process steps and devices been presented to illustrate the invention. However, the invention is not limited to merely these examples. Other variations and embodiments of the invention will occur to those skilled in the art.

I claim:

1. A method for the in-situ determination of vehicle wheel position using an inertial measurement unit (IMU), the method comprising:
   providing an IMU comprising at least two accelerometers mounted on a wheel of a vehicle;
   using the accelerometers, measuring linear acceleration on the wheel;
   exclusively comparing only linear acceleration measurements on the wheel; and,
      in response to comparing the linear acceleration measurements on the wheel, determining a wheel toe angle.

2. The method of claim 1
   further comprising:
   measuring linear acceleration on the vehicle; and, comparing instantaneous linear acceleration measurements on the wheel to instantaneous linear acceleration on the vehicle to predict vehicle movement.

3. The method of claim 1 wherein providing the IMU includes providing a first accelerometer aligned along a lateral axis of a non-rotating portion of the wheel, a second accelerometer aligned along a roll axis of a non-rotating portion of the wheel, orthogonal to the lateral axis, and a third accelerometer aligned along a yaw axis of a non-rotating portion of the wheel, orthogonal to both the lateral and roll axes.

4. The method of claim 3 wherein determining the wheel toe angle includes:
  comparing the third accelerometer measurements to gravity (1G) to find a camber angle defined between vertical (1G) and the yaw axis of the wheel; and,
  using the camber angle, subtracting components from the first and second accelerometer measurements due to gravity to determine calibrated first and second accelerometer measurements, and finding the wheel toe angle in response to comparing either the calibrated first or calibrated second accelerometer measurements to the sum of the calibrated first and second accelerometer measurements, measured when the vehicle is in motion.

5. The method of claim 4 wherein finding the toe angle includes averaging calibrated first and second accelerometer measurements.

6. The method of claim 1 wherein providing the IMU includes providing a first accelerometer aligned along a lateral axis of a rotating portion the wheel and a second accelerometer aligned along a radial axis of a rotating portion of the wheel, orthogonal to the lateral axis.

7. The method of claim 6 wherein determining wheel alignment angles includes:
  accepting second accelerometer measurements in a plurality of instances subsequent to a corresponding plurality of vehicle movements, when the wheel is stationary;
  determining a peak accelerometer measurement selected from the group consisting of a maximum accelerometer measurement, a minimum accelerometer measurement, and combinations thereof, and determining a camber angle by comparing the peak accelerometer measurement to a constant selected from the group consisting of zero and gravity (1G); and,
  using the camber angle, subtracting components from the first and second accelerometer measurements due to gravity to determine calibrated first and second accelerometer measurements, and finding the wheel toe angle in response to comparing either the calibrated first or second accelerometer measurements to the sum of the calibrated first and second accelerometer measurements, measured when the vehicle is in motion.

8. A method for the in-situ determination of vehicle wheel position using an inertial measurement unit (IMU), the method comprising:
  providing an IMU comprising an accelerometer mounted on a rotating part of a wheel of a vehicle, aligned along a radial axis of the wheel;
  using the accelerometer, measuring acceleration on the wheel as follows:
    accepting accelerometer measurements in a plurality of instances subsequent to a corresponding plurality of vehicle movements, when the wheel is stationary;
    determining a peak accelerometer measurement selected from the group consisting of a maximum accelerometer measurement, a minimum accelerometer measurement, and combinations thereof, and,
    determining a camber angle by comparing the peak accelerometer measurement to a constant selected from the group consisting of zero and gravity (1G).

9. A system for the in-situ determination of vehicle wheel position using an inertial measurement unit (IMU), the system comprising:
  an IMU comprising accelerometers mounted on a wheel of a vehicle, having outputs to supply linear accelerometer measurements;
  a processor;
  a non-transitory memory; and,
  an application enabled as a sequence of processor executable instructions stored in the memory, the application accepting linear accelerometer measurements on the wheel, and exclusively comparing only the linear acceleration on the wheel to determine a wheel toe angle.

10. The system of claim 9 wherein the application accepts linear acceleration measurements on the vehicle, compares instantaneous linear acceleration measurements on the wheel to instantaneous linear acceleration measurements on the vehicle, and predicts vehicle movement.

11. The system of claim 9 wherein the application accepts an initial toe angle measurement, and determines an out-of-alignment condition when the initial toe angle measurement differs from a subsequently determined toe angle measurement by a predetermined amount.

12. The system of claim 9 wherein the accelerometers are mounted on a non-rotating portion of the wheel.

13. The system of claim 12 wherein the IMU comprises a first accelerometer aligned along a lateral axis of the wheel, a second accelerometer aligned along a roll axis of the wheel, orthogonal to the lateral axis, and a third accelerometer aligned along a yaw axis of the wheel, orthogonal to both the lateral and roll axes.

14. The system of claim 13 wherein the application compares the third accelerometer measurements to gravity (1G) to find a camber angle defined between vertical (1G) and the yaw axis of the wheel; and,
  wherein the application, using the camber angle, subtracts components from the first and second accelerometer measurements due to gravity to determine calibrated first and second accelerometer measurements, and finds the wheel toe angle in response to comparing either the calibrated first or calibrated second accelerometer measurements to the sum of the calibrated first and second accelerometer measurements, measured when the vehicle is in motion.

15. The system of claim 14 wherein the application averages the calibrated first and second accelerometer measurements.

16. The system of claim 9 wherein the accelerometers are mounted on a rotating portion of the wheel.

17. The system of claim 16 wherein the IMU comprises a first accelerometer aligned along a lateral axis of the wheel and a second accelerometer aligned along a radial axis of the wheel, orthogonal to the lateral axis.

18. The system of claim 17 wherein the application accepts second accelerometer measurements in a plurality of instances subsequent to a corresponding plurality of vehicle movements, when the wheel is stationary; and,
  wherein the application determines a peak accelerometer measurement selected from the group consisting of a maximum accelerometer measurement, a minimum accelerometer measurement, and combinations thereof, and determines a camber angle by comparing the peak accelerometer measurement to a constant selected from the group consisting of zero and gravity (1G).

19. The system of claim 18 wherein the application, using the camber angle, subtracts components from the first and second accelerometer measurements due to gravity to determine calibrated first and second accelerometer measurements, and finds the wheel toe angle in response to comparing either the calibrated first or calibrated second accelerometer measurements to the sum of the calibrated first and second accelerometer measurements, measured when the vehicle is in motion.

20. The system of claim 19 wherein the application averages the calibrated first accelerometer measurements and calibrated second accelerometer measurements.

* * * * *